(12) United States Patent
Nishi et al.

(10) Patent No.: US 8,081,580 B2
(45) Date of Patent: Dec. 20, 2011

(54) NETWORK VERIFICATION SYSTEM

(75) Inventors: Tetsuya Nishi, Kawasaki (JP);
Tomonori Gotoh, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 93 days.

(21) Appl. No.: 12/538,323

(22) Filed: Aug. 10, 2009

(65) Prior Publication Data
US 2009/0296588 A1  Dec. 3, 2009

Related U.S. Application Data

(63) Continuation of application No. PCT/JP2007/055198, filed on Mar. 15, 2007.

(51) Int. Cl.
*H04J 1/16* (2006.01)
(52) U.S. Cl. ......... 370/252; 370/241; 370/248; 370/249
(58) Field of Classification Search ........... 370/241–253
See application file for complete search history.

(56) References Cited

U.S. PATENT DOCUMENTS

| | | | |
|---|---|---|---|
| 5,708,654 A * | 1/1998 | Arndt et al. | 370/242 |
| 6,002,671 A * | 12/1999 | Kahkoska et al. | 370/248 |
| 7,480,250 B2 * | 1/2009 | Choi | 370/242 |

FOREIGN PATENT DOCUMENTS

| | | |
|---|---|---|
| JP | 10-135982 | 5/1998 |
| JP | 2000-209205 | 7/2000 |
| JP | 2002-185464 | 6/2002 |
| JP | 2002-353983 | 12/2002 |
| JP | 2006-277569 | 10/2006 |

OTHER PUBLICATIONS

International Preliminary Report on Patentability and Written Opinion of the International Search Authority dated Sep. 29, 2009, from the corresponding International Application.

* cited by examiner

*Primary Examiner* — Hassan Kizou
*Assistant Examiner* — Ashil Farahmand
(74) *Attorney, Agent, or Firm* — Katten Muchin Rosenman LLP

(57) ABSTRACT

A network verification system verifies a network to which a relay apparatus relays a packet. A test management apparatus includes a condition acquiring unit to acquire verification conditions which contain an unused network address as a test target and a registering unit to register, in an address resolution table of the relay apparatus, an entry in which the unused network address contained in the acquired verification conditions is associated with a physical address of the testing apparatus. A testing apparatus includes a test packet transmitting unit to transmit, when instructed by the test management apparatus, the plurality of test packets to form a plurality of connections based on the verification conditions, a test packet receiving unit to receive the plurality of test packets and a measuring unit to measure communication qualities with respect to the respective connections of the plurality of test packets.

10 Claims, 17 Drawing Sheets

NETWORK VERIFICATION SYSTEM

CROSS-REFERENCE TO RELATED APPLICATIONS

This is a continuation of Application PCT/JP2007/055198, filed on Mar. 15, 2007, now pending, the contents of which are herein wholly incorporated by reference.

FIELD

The present invention relates to a network verification system which verifies a network in advance.

BACKGROUND

Over the recent years, communication services provided in an IP (Internet Protocol) network such as a VoIP (Voice over Internet Protocol) service have been diversified. A case of newly adding the VoIP service involves previously performing a high-load test for confirming mutual communications and qualities between multiple points and estimating the number of serviceable connections etc. As in the high-load test, it is important to verify the network quality such as pinpointing where a fault occurs in the network and checking the number of connections in which the quality begins to deteriorate.

Such being the case, the network quality test between the multi points is conducted by use of a measuring device as depicted in FIGS. 16 and 17. FIGS. 16 and 17 are diagrams each illustrating an example of the conventional network quality test.

The test illustrated in FIG. 16 involves using a measuring device 501 capable of transmitting and receiving a test packet in a way that designates a pair of one source IP address and one destination IP address (which will hereinafter be also termed a connection). According to this testing method, the measuring device 501 is individually disposed for each connection to perform a simultaneous quality test for the plurality of connections.

The test illustrated in FIG. 17 involves employing a single measuring device 503 capable of transmitting packets for the plurality of connections. According to this testing method, the source IP addresses and the destination IP addresses associated with the plurality of connections are set in the measuring device, and the packets of these connections are transmitted, thereby measuring the qualities simultaneously by monitoring any one of routes within a subnetwork on a receiving side.

Note that the following document is disclosed as the document of the technique related to an aspect of the invention. The following Patent document 1 discloses an address resolution method of each server apparatus with a load shared by a load sharing device as a technique of preventing all pieces of communication data between a client and a server from concentrating on the load sharing device and of making IP address translation unnecessary on the load sharing device. The Patent document 1 is Japanese Patent Laid-Open Publication No. 2006-277569.

SUMMARY

The method depicted in FIG. 16 among the conventional network quality testing methods described above, however, entails preparing the measuring devices by a number of the test target connections, which leads to a large scale of system architecture for testing, resulting in a rise in cost.

Further, in the method illustrated in FIG. 17, an excessive load is applied to the server etc that is in operation, and there might be a case of affecting a user who accesses the server etc. This is because, if there exists a multiplicity of test target IP addresses that is not yet used at the present (the IP addresses set in terminal devices scheduled to be connected when adding the communication service), a gateway router transmits ARP (Address Resolution Protocol) requests with respect to the unused IP addresses for a MAC (Media Access Control) address resolution, and the ARP requests are transferred to the in-operation server etc.

A first mode of the present invention is a network verification system, including a testing apparatus which transmits and receives a test packet and a test management apparatus, for verifying a network to which a relay apparatus relays a packet, the test management apparatus comprising: a condition acquiring unit to acquire verification conditions for verifying the network, which contain an unused network address as a test target; a registering unit to register, in an address resolution table of the relay apparatus relaying the packet to the network in which the testing apparatus is disposed, an entry in which the unused network address contained in the verification conditions acquired by the condition acquiring unit is associated with a physical address of the testing apparatus; and an instructing unit to instruct, after the registering unit has registered the entry, the testing apparatus to transmit and receive the test packet, the testing apparatus comprising: a test packet transmitting unit to transmit, when instructed by the instructing unit, a plurality of test packets to form a plurality of connections on the basis of the verification conditions; a test packet receiving unit to receive the plurality of test packets; and a measuring unit to measure communication qualities with respect to each of the plurality of the connections of the plurality of test packets received by the test packet receiving unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

An embodiment will hereinafter be described with reference to the drawings. Configurations in the following embodiments are exemplifications, and the present invention is not limited to the configurations in the embodiments.

First Embodiment

A network verification system of a first embodiment will hereinafter be described.

[Network Architecture]

Figure 1:
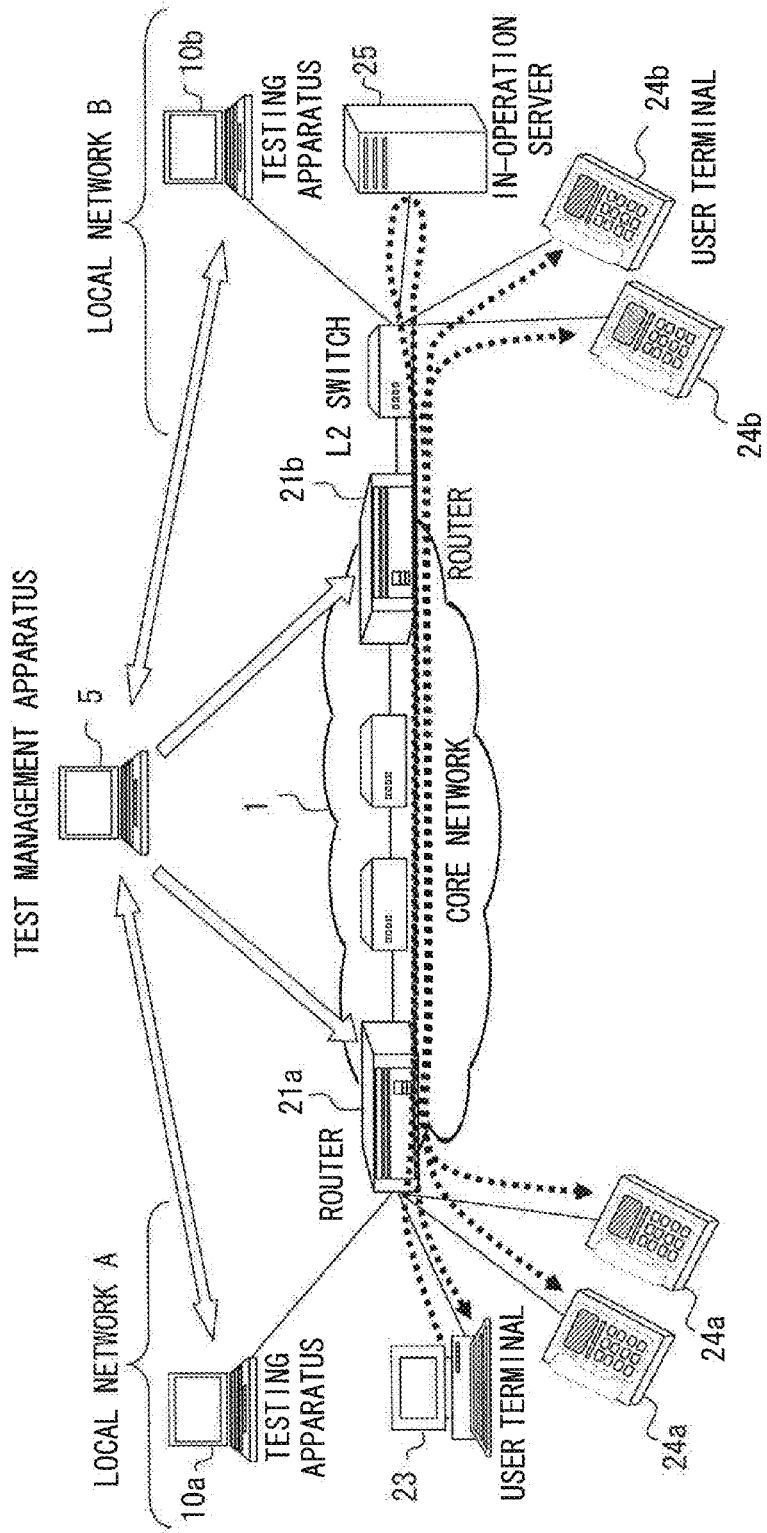
FIG. 1 is a diagram illustrating an example of a apparatus configuration of a network verification system in a first embodiment.

A apparatus configuration for carrying out the network verification system in the first embodiment will hereinafter be described with reference to FIG. 1. FIG. 1 is a view illustrating an example of the apparatus configuration of the network verification system in the first embodiment.

In the example in FIG. 1, a local network A connected via a router 21a to a core network 1 and a local network B connected via a router 21b to a core network 1 are set as test target networks, and a series of networks such as the local network A, the core network 1 and the local network B are verified.

Further, an assumption on the occasion of verifying the networks is that a server apparatus 25 and user terminals 23, 24a, 24b are connected to the local networks A and B and are in operation. The user terminals 23, 24a, 24b are respectively exemplified such as personal computers and IP phones. The server apparatus 25 is, e.g., a Web server and provides various categories of contents to the user terminals. The embodiment performs the network verification in a way that does not affect the communication services provided to the respective in-operation apparatuses.

The network verification system in the first embodiment includes a test management apparatus 5, testing apparatuses 10a, 10b. The testing apparatus 10a is connected to the test target local network A, while the testing apparatus 10b is similarly connected to the test target local network B. The testing apparatuses 10a, 10b transmit and receive packets for testing to and from each other, and measure a communication quality of the test target network on the basis of a receiving status of the test packet.

Figure 2:
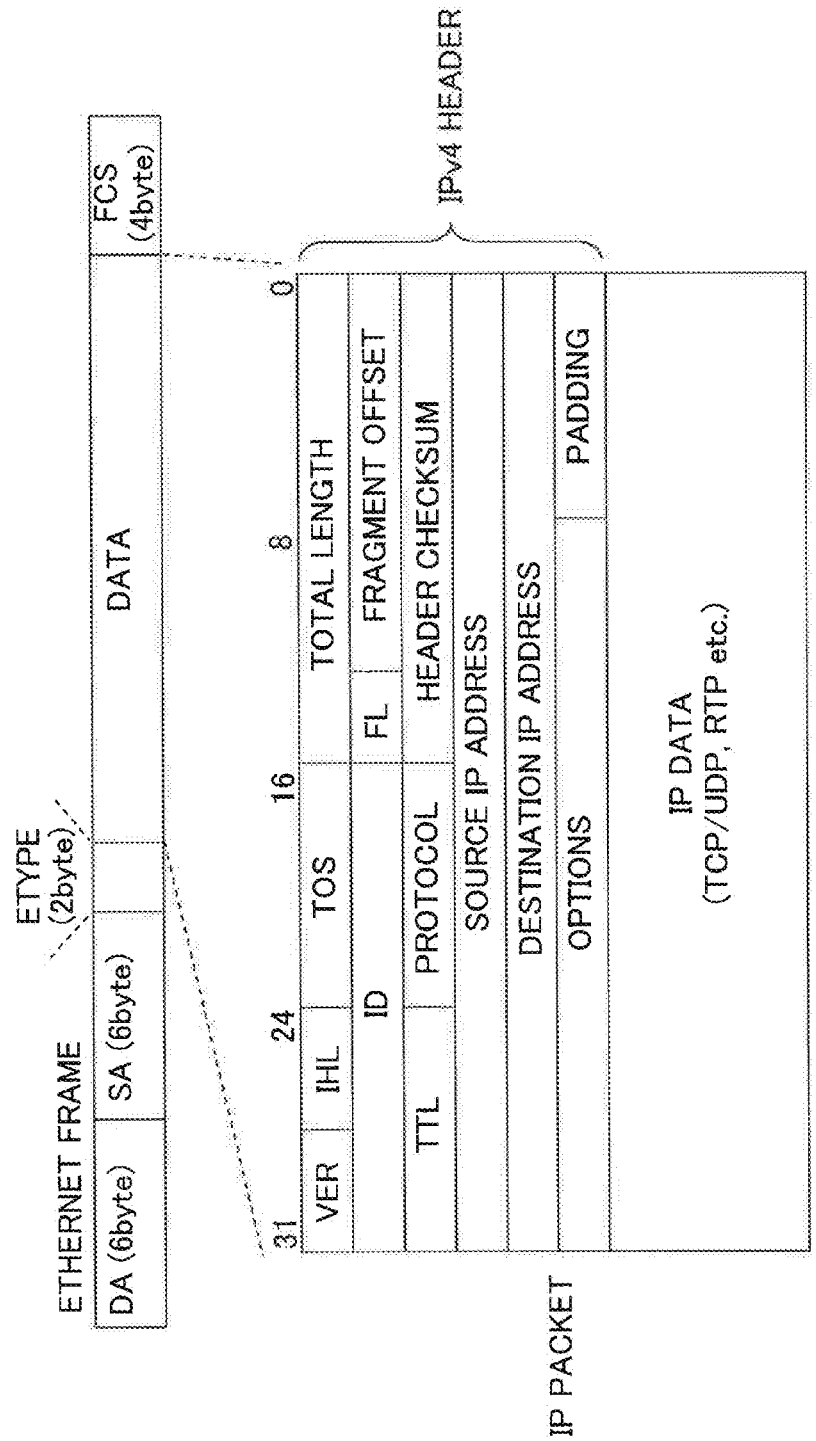
FIG. 2 is a diagram depicting an IP packet format.

FIG. 2 is a diagram illustrating an IP packet format. The testing apparatuses 10a, 10b transmit and receive predetermined IP packets as the test packets. In the test packet, as depicted in FIG. 2, predetermined values sent from the test management apparatus 5 are set in a TOS (Type of Service) field, a TTL (Time to Live) field, a source IP address (SOURCE IP ADDRESS) field, a destination IP address (DESTINATION IP ADDRESS) field, of an IP header. Herein, a MAC address is a 6-byte address set in each of the destination address (DA) field and the source address (SA) field each attached to the header of an ETHERNET (registered trademark) frame in FIG. 2. An in-depth description of the test packet will be made later on.

The test management apparatus 5 prompts a user etc to set verification conditions in terms of executing the network verification, transmits the verification conditions to the testing apparatuses 10a, 10b and collects pieces of quality information measured by the testing apparatuses 10a, 10b. Further, the test management apparatus 5, on the occasion of performing the network verification, changes setting information of edge routers 21a, 21b which connect the test target local networks A and B to the core network 1.

[Configuration]

Respective configurations in the testing apparatuses 10a, 10b and the test management apparatus 5 which build up the network verification system in the first embodiment will be described.

<Test Management Apparatus>

Figure 3:
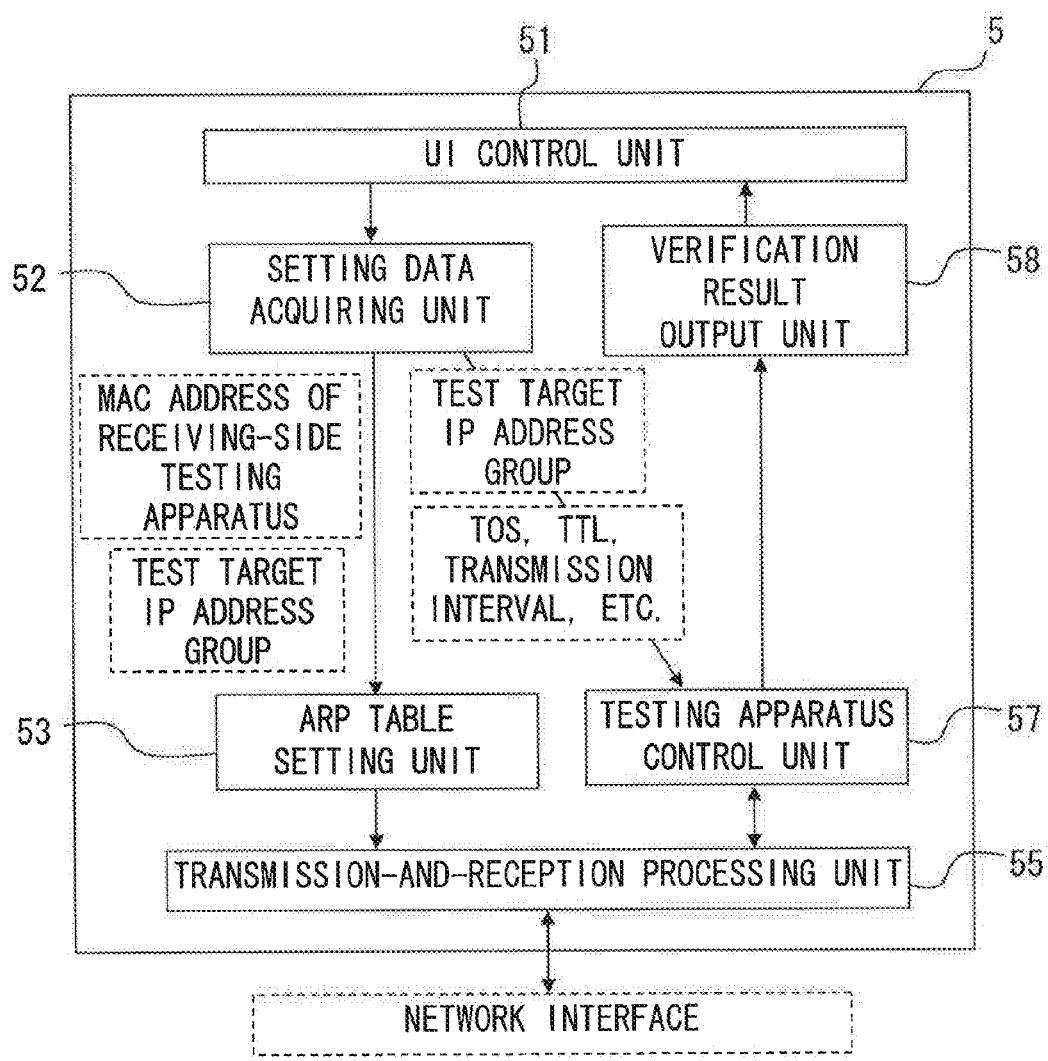
FIG. 3 is a block diagram illustrating a configuration of a test management apparatus in the first embodiment.

A functional of the test management apparatus 5 will be discussed by use of FIG. 3. FIG. 3 is a block diagram illustrating a configuration of the test management apparatus in the first embodiment.

The test management apparatus 5 has, as a hardware configuration, a CPU (Central Processing Unit), a memory, an input-and-output interface, etc. The test management apparatus 5 includes, as the input-and-output interface, at least a network interface card for establishing the connection to the network, and includes, as other components, a display for displaying a user interface, and so forth. The test management apparatus 5 may be configured by a general-purpose computer such as a personal computer and may also be configured by a dedicated computer. The embodiment does not limit such a hardware configuration of the test management apparatus 5. The test management apparatus 5 actualizes the respective units depicted in FIG. 3 in such a way that the CPU reads and executes application programs stored in, e.g., the memory (hard disk) etc.

The test management apparatus 5 in the first embodiment has, as illustrated in FIG. 3, a user interface control unit (which will hereinafter be abbreviated to a UI control unit) 51, a setting data acquiring unit 52, an ARP table setting unit 53, a transmission-and-reception processing unit 55, a testing apparatus control unit 57, a verification result output unit 58, etc. These units will hereinafter be explained.

The UI control unit 51 conducts control related to the user interface. For example, the UI control unit 51 displays a predetermined operation screen on the display, and acquires data inputted corresponding to an operation of the operation screen by use of a keyboard, a mouse, etc. Moreover, the UI control unit 51 displays verification result information sent from the verification result output unit 58 on the display. The UI control unit 51 may also display a screen enabling the user to customize the verification result information. The operation screen is formed so that the user can input the verification conditions and a test starting event that are used in the network verification system in the first embodiment.

The verification conditions are exemplified such as a test type, a test target source IP address, a test target destination IP address, a TOS (Type of Service), a TTL (Time to Live), a transmission interval, test execution time, and MAC addresses of the testing apparatuses 10a, 10b. A test target protocol type is set as the test type. In the case of verifying an IP telephone when the IP telephone is newly installed, an RTP (Real-time Transport Protocol) is set as the protocol type. Further, if the in-operation server 25 in FIG. 1 is a Web server and if a new user terminal accessing the server 25 is installed to the local network A, an HTTP (HyperText Transfer Protocol) is set as the protocol type.

Hereinafter, communications such as HTTP and FTP (File Transfer Protocol), in which a client requests the server for the data, shall be referred to as client-server communications, while the communications such as the RTP shall be termed peer-to-peer communications. Note that in the case of verifying the peer-to-peer communications, a test-dedicated protocol may also be set as the protocol type.

IP addresses, which will be set in the newly-installed IP phone, the user terminal, etc, are set as the test target source IP addresses and the test target destination IP addresses. For instance, addresses starting with 192.168.1.25 and ending with the 100th address are set as the source IP addresses or the destination IP addresses.

A value, which will be set in a TOS field of an IP header, is set in the TOS. A piece of 5-bit data representing a quality of service of the communications is specified in this TOS field. Accordingly, in the case of verifying the communications using the IP phones, e.g., [5] representing the top priority is set in the TOS.

A value, which will be set in a TTL field of the IP header, is set in the TTL. A maximum hop count, at which datagram is kept forwarding, is set in the TTL field in order to prevent the datagram from continuing to be forwarded within the network. The value set in the TTL field is decremented by [1] each time a router forwards the datagram, and the datagram is discarded when the TTL value is decremented down to [0].

A transmission interval of the same connection of test packets transmitted from the testing apparatus 10a or 10b is set as the transmission interval. For example, the RTP is set as the test target protocol type, and 20 milliseconds (ms) is set as an initial setting value in this transmission interval.

A period of time for which the test is performed in terms of conducting the network verification is set as the test execution time. During the test execution time after occurrence of a test start event, the test packet continues to be transmitted from the testing apparatus at a predetermined transmission interval.

Similarly, the MAC addresses of the testing apparatuses 10a, 10b, which are contained in the verification conditions, may be inputted from on the operation screen controlled by the UI control unit 51 and may also be automatically collected through the communication from the testing apparatuses 10a, 10b.

These verification conditions and the test start event are transmitted to the setting data acquiring unit 52.

The setting data acquiring unit 52 transmits, to the ARP table setting unit 53, the test target IP address group, the test execution time and the MAC addresses of the testing apparatuses 10a, 10b among the verification conditions. The setting data acquiring unit 52 sends all of the acquired verification conditions and the test start event to the testing apparatus control unit 57.

The testing apparatus control unit 57 instructs the testing apparatuses 10a, 10b to start and finish the network verification. The testing apparatus control unit 57, upon receiving the test start event, notifies the target testing apparatus of a start of the test via the transmission-and-reception processing unit 55. Thus, in the case of notifying of the start of the test, the testing apparatus control unit 57 instructs the transmission-and-reception processing unit 55 to transmit the verification conditions sent from the setting data acquiring unit 52 to the target testing apparatuses 10a, 10b.

The testing apparatus control unit 57 monitors, after notifying of the start of the test, an elapse of the test execution time contained in the verification conditions. The testing apparatus control unit 57, when the test execution time expires, notifies the target testing apparatus of an end of the test. The testing apparatus control unit 57, after notifying of the end of the test, transmits the quality information sent from the testing apparatus 10a or 10b and received by the transmission-and-reception processing unit 55 to the verification result output unit 58.

The ARP table setting unit 53 controls the transmission-and-reception processing unit 55, thereby updating the ARP tables of the edge routers 21a, 21b which connect the test target local networks A, B to the core network 1. At this time, the ARP table setting unit 53 transmits pair-data of the MAC addresses of the testing apparatuses 10a, 10b and the test target IP address group to the transmission-and-reception processing unit 55. If the client-server protocol is set as the test target protocol type, the ARP table setting unit 53 updates the ARP table of the client-side edge router. Further, if the peer-to-peer protocol is set as the test target protocol type, the ARP table setting unit 53 updates the ARP tables of both of the edge routers.

Moreover, the ARP table setting unit 53 controls the transmission-and-reception processing unit 55, thereby performing the setting of an aging function of the ARP table before updating the ARP table of the router. The aging function is a function of erasing and then re-updating the ARP table after a predetermined period of aging time has elapsed. The ARP table setting unit 53 sets the test execution time in an aging timer of the router. With this setting, during the execution of the test, entries of the ARP table, which are added by the ARP table setting unit 53, are not erased. Note that if a flag for controlling execution (ON) and stop (OFF) of the aging function is provided in a setting item of the router, the ARP table setting unit 53 may implement the setting which stops the aging function during a period till the end of the test since the start of the test. Furthermore, if the aging timer of the router has already been set to a period of time longer than the test execution time, the aging timer may not be updated.

The transmission-and-reception processing unit 55 updates the ARP table of the router on the basis of an instruction and the data given from the ARP table setting unit 53. This automatic update of the ARP table is realized in a way that logs in to the desired router by use of, e.g., a TELNET protocol and executes an ARP command.

Further, the transmission-and-reception processing unit 55 notifies, based on the instruction given from the testing apparatus control unit 57, the testing apparatuses 10a, 10b of test start and test end. The transmission-and-reception processing unit 55 transmits similarly, when notifying the test start, the verification conditions sent from the testing apparatus control unit 57 to the testing apparatuses 10a, 10b. The transmission-and-reception processing unit 55, when finishing the test, receives the measured quality information sent from the testing apparatuses 10a, 10b and transmits the same information to the testing apparatus control unit 57.

The verification result output unit 58 collects pieces of quality information measured by the testing apparatuses 10a, 10b and generates, based on these pieces of quality information, network verification result information. The network verification result information is transmitted to the UI control unit 51.

<Testing Apparatus>

Figure 4:
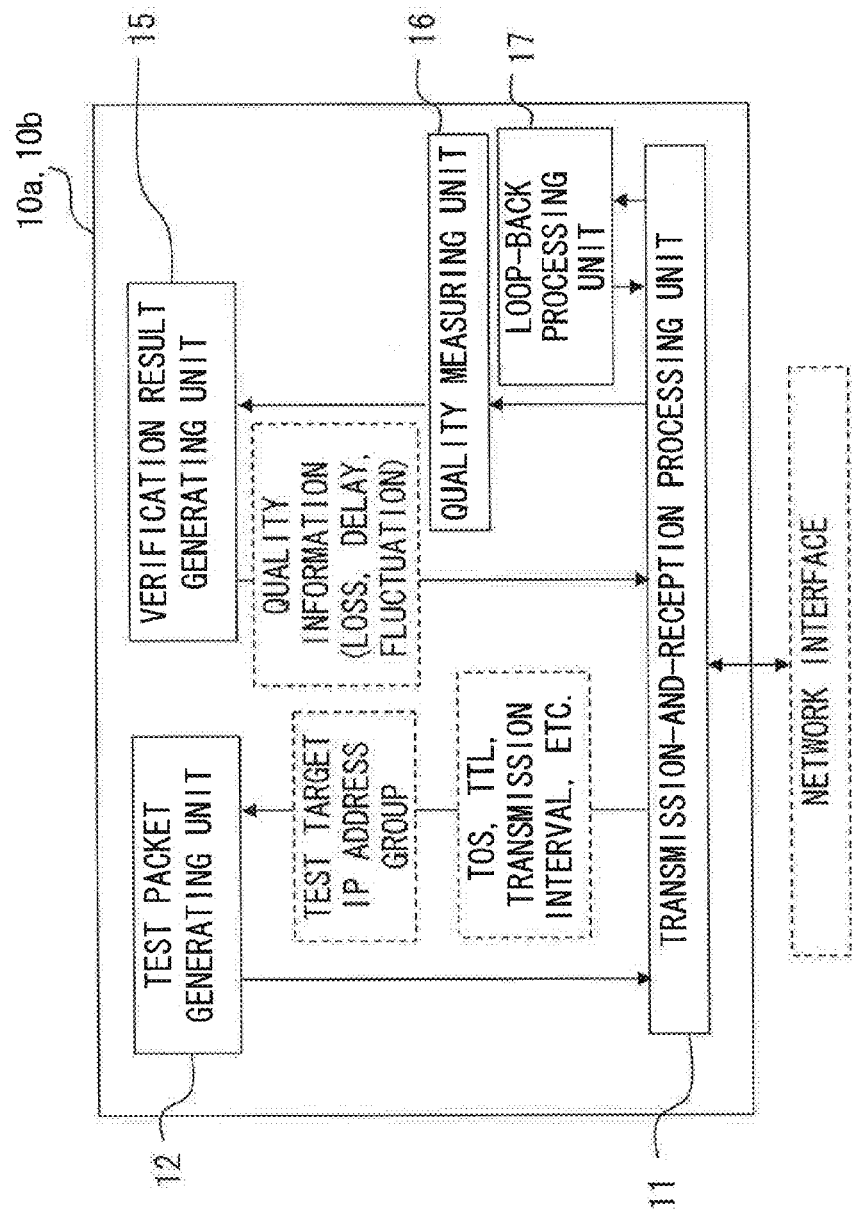
FIG. 4 is a block diagram illustrating a configuration of a testing apparatus in the first embodiment.

A configuration of each of the testing apparatuses 10a, 10b will hereinafter be described with reference to FIG. 4. FIG. 4 is a block diagram illustrating the configuration of the testing apparatus in the first embodiment. Note that if the following discussion has no necessity for distinguishing particularly between the testing apparatus 10a and the testing apparatus 10b, these testing apparatuses will be expressed by putting neither the numerals nor the symbols thereon.

The testing apparatus includes, as a hardware configuration, a CPU (Central Processing Unit), a memory, an input-and-output interface, etc. The testing apparatus at least includes, as the input-and-output interface, a network interface card for establishing the connection to the network. The testing apparatus may be configured by a general-purpose computer such as a personal computer and may also be configured by a dedicated computer. The embodiment does not limit the hardware configuration, such as this, of the testing apparatus. Application programs stored in e.g., the memory (hard disk) etc. are read and executed by the CPU, thereby the testing apparatus actualizes the respective function units illustrated in FIG. 4.

The testing apparatus in the first embodiment has, as depicted in FIG. 4, a test packet generating unit 12, a verification result generating unit 15, a quality measuring unit 16, a loop-back processing unit 17, a transmission-and-reception processing unit 11 and so on. These units will hereinafter be described.

The transmission-and-reception processing unit 11 executes a process of transmitting and receiving the IP packet by controlling the network interface card. The transmission-and-reception processing unit 11, when receiving the verification conditions sent from the test management apparatus 5, transmits the verification conditions to the test packet generating unit 12. The transmission-and-reception processing unit 11, upon receiving the test packets and the information of the transmission interval of the test packet from the test packet generating unit 12, sequentially transmits the test packets at the transmission interval. The transmission-and-reception processing unit 11, when receiving a response test packet from the loop-back processing unit 17, sends this response test packet as it is.

Furthermore, the transmission-and-reception processing unit 11 determines, when receiving the test packet sent from another testing apparatus, whether or not this test packet is a packet used in the client-server protocol. The transmission-and-reception processing unit 11, when deciding that the test packet is the packet used in the client-server protocol, transfers this test packet to the loop-back processing unit 17. The transmission-and-reception processing unit 11, when deciding that the test packet is the response test packet transmitted from another testing apparatus as well as being the packet used in the peer-to-peer protocol or the packet used in the client-server protocol, transmits this test packet to the quality measuring unit 16 together with the receiving time thereof. Further, the transmission-and-reception processing unit 11, upon receiving the quality information from the verification result generating unit 15, transmits this quality information to the test management apparatus 5.

The test packet generating unit 12, when receiving the verification conditions from the transmission-and-reception processing unit 11, generates the test packets based on the verification conditions. To be specific, the test packet generating unit 12 generates the test packets having a format corresponding to the test type in the verification conditions by a connection count contained in the test target IP address group. The test packet generating unit 12 sets TOS data and TTL data contained in the verification conditions in the TOS field and the TTL field of the IP header field of the thus-generated test packet.

The test packet generating unit 12, if the test-dedicated protocol is set as the test type in the verification conditions, may generate a dedicated test packet with dummy data set in a data field (payload) of the IP packet. The test packet generating unit 12 transmits the generated test packet together with the transmission interval thereof to the transmission-and-reception processing unit 11.

The loop-back processing unit 17, if the test packet of the client-server protocol is transmitted from another testing apparatus, transmits the response test packet serving as a response to this test packet to another testing apparatus via the transmission-and-reception processing unit 11. Note that the response test packet can be generated in a way that exchanges the source IP address and the destination IP address set in the corresponding test packet with each other, changes a destination port number into a source port number each set in the same test packet, and sets a response code in the HTTP data to "Normal" (200).

The quality measuring unit 16, when receiving the test packet, the response test packet and the receiving time that are transmitted from another testing apparatus, measures e.g., a loss, a delay and a fluctuation on every connections as the communication quality on the basis of the test packet and the response test packet.

Specifically, if the test packet is the RTP packet, a sequence number set in an RTP header is retained each time the test packet is received, and the loss is detected by finding out a missing sequence number. Similarly, as for the delay, a difference between a timestamp set in the RTP header and the receiving time of the test packet is calculated, and occurrence of the delay is determined if this difference is equal to or larger than a predetermined upper limit threshold value. Concerning the fluctuation, the receiving time of the test packet is successively retained on every connections, then, statistics of the reception intervals of the consecutive test packets within the same connection are obtained, and the fluctuation is detected if a variation in the reception intervals is large. The thus-measured quality information is sent to the verification result generating unit 15. The upper limit threshold value for detecting the communication quality is stored adjustably in the memory.

The verification result generating unit 15, when receiving the pieces of quality information of each connection, organizes and thus retains these pieces of quality information. The verification result generating unit 15, when the transmission-and-reception processing unit 11 receives the test ending notification from the test management apparatus 5, instructs the transmission-and-reception processing unit 11 to transmit all of the retained quality information to the test management apparatus 5.

Operational Example

Figure 5:
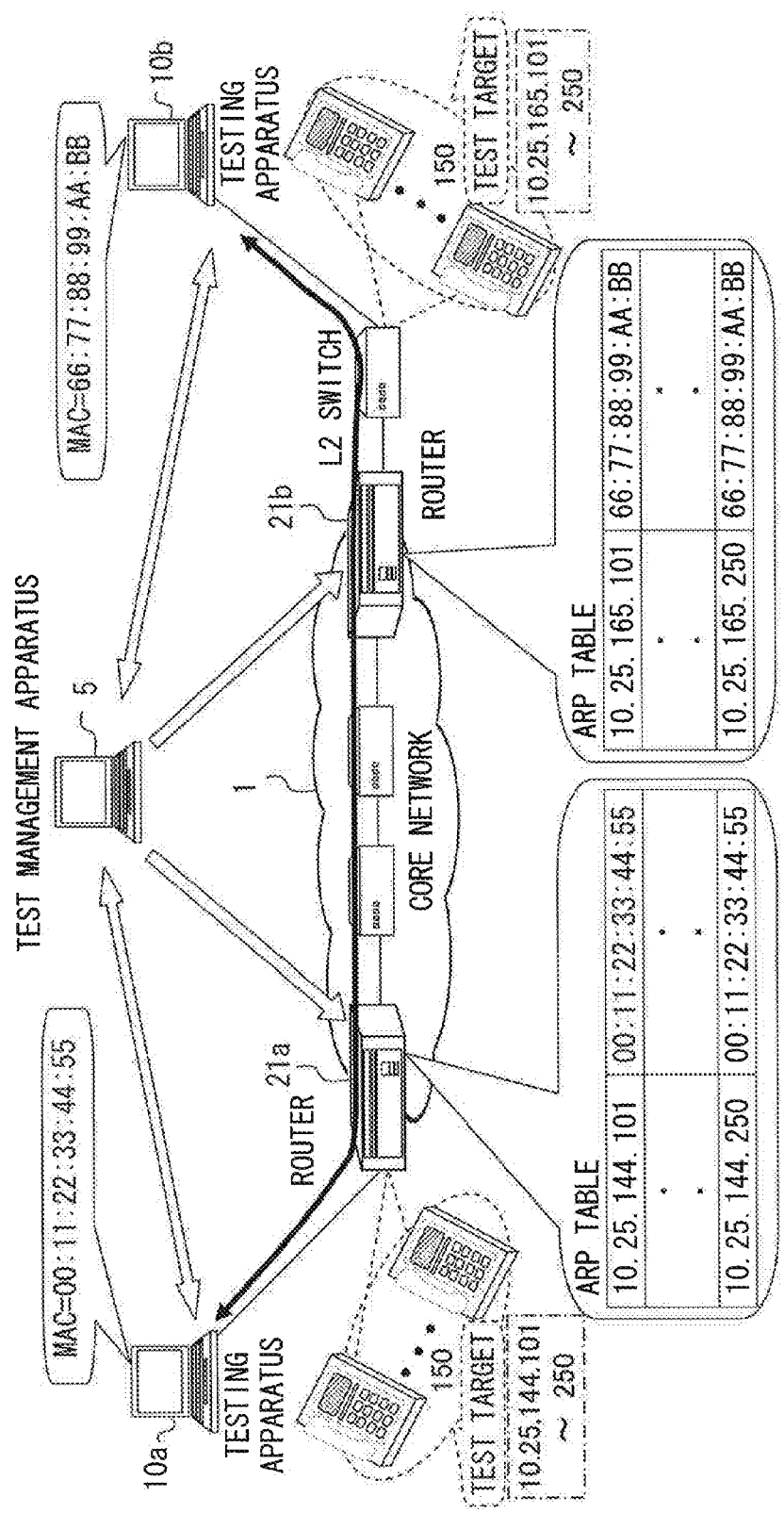
FIG. 5 is a diagram illustrating an example of verifying peer-to-peer communications in the network verification system in the first embodiment.
Figure 6:
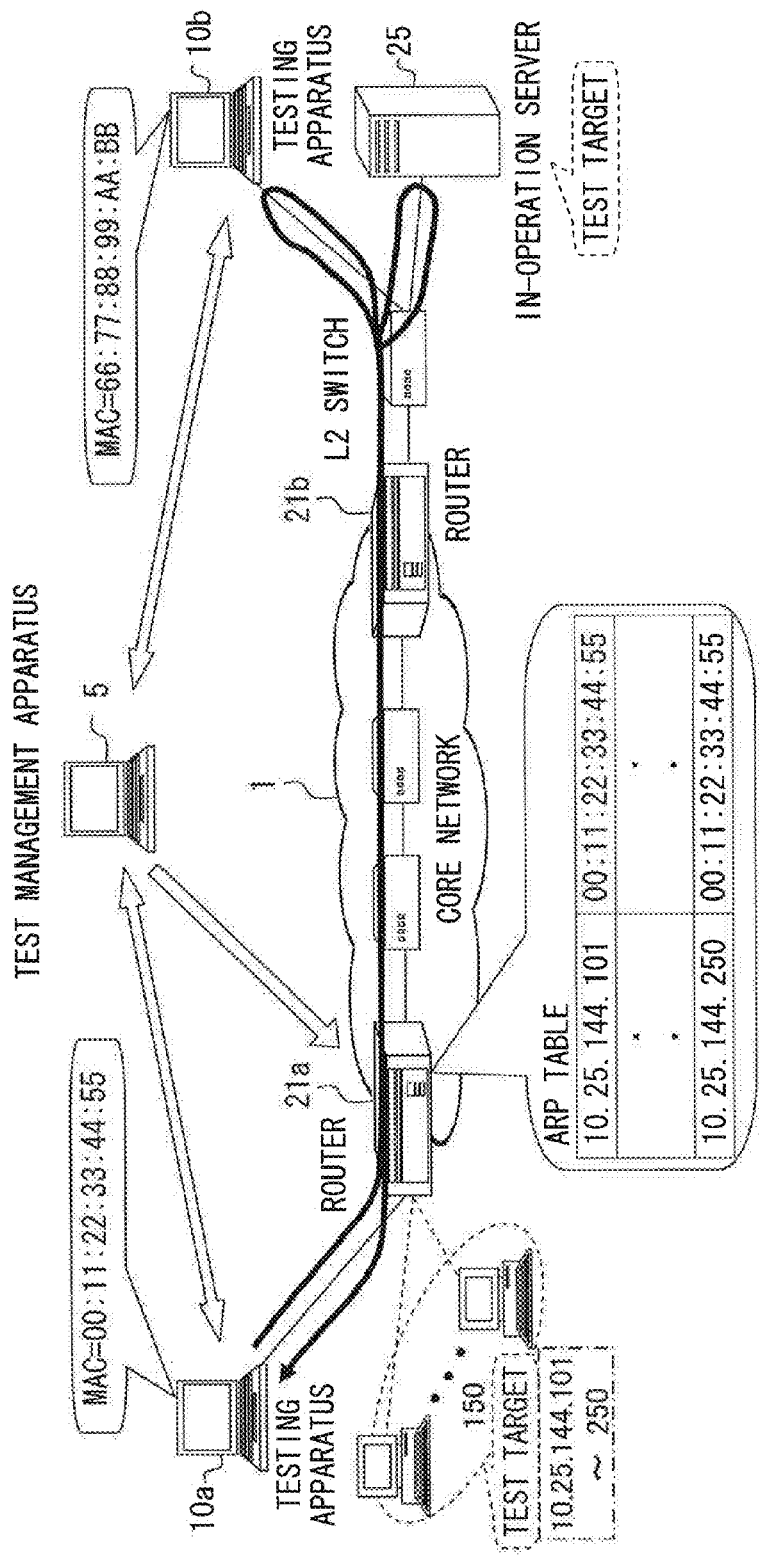
FIG. 6 is a diagram illustrating an example of verifying client-server communications in the network verification system in the first embodiment.

Next, operational examples of the test management apparatus 5 and the testing apparatuses 10a, 10b in the network verification system according to the first embodiment will hereinafter be described with reference to FIGS. 5 and 6. FIG. 5 is a diagram illustrating an example of verifying the peer-to-peer communications by the network verification system in the first embodiment. FIG. 6 is a diagram illustrating an example of verifying the client-server communications of the network verification system in the first embodiment.

\<Verification of Peer-to-Peer Communications\>

To begin with, the operations of the test management apparatus 5 and the testing apparatuses 10*a*, 10*b* in the case of implementing the verification of the peer-to-peer communications will be explained with reference to FIG. 5. What can be assumed as an example in FIG. 5 is a case of newly adding a VoIP service to between the local network A and the local network B. A subnet address (10.25.144.0) is set in the local network A, and a subnet address (10.25.165.0) is set in the local network B. In this status, it is scheduled that IP addresses (10.25.144.101 through 10.25.144.250) are newly allocated to the local network A, and IP addresses (10.25.165.101 through 10.25.165.250) are newly allocated to the local network B. On the occasion of implementing the network verification, the testing apparatus 10*a* is connected to the local network A, while the testing apparatus 10*b* is connected to the local network B. As the IP address set in each of these testing apparatuses 10*a*, 10*b*, any one of the IP addresses scheduled to be newly allocated may be set, and a new IP address for the testing apparatus may also be set.

Items inputted by the user (the network administrator etc) onto an operation screen displayed on the display etc of the test management apparatus 5 are the newly allocated IP addresses, the RTP as the protocol type, a value (5) representing the top priority as the TOS, 20 ms as the transmission interval and 10 min as the test execution time. Similarly, each of MAC addresses of the testing apparatus 10*a* connecting to the local network A and the MAC address of the testing apparatus 10*b* connecting to the local network B are inputted. As a matter of course, the test management apparatus 5 may also acquire these MAC addresses from the testing apparatuses 10*a*, 10*b* which are automatically connected to the networks.

In the test management apparatus 5, these input verification conditions are transmitted to the setting data acquiring unit 52 from the UI control unit 51 and further transmitted to the ARP table setting unit 53 and the testing apparatus control unit 57.

The ARP table setting unit 53 controls the transmission-and-reception processing unit 55, whereby the aging timers of the routers 21*a*, 21*b*, of which the ARP tables are updated, are set to the test execution time (10 min). The ARP table setting unit 53, if the time longer than the test execution time has already been set in the aging timer, may not conduct this setting. Subsequently, the ARP table setting unit 53 adds the IP address group (10.25.144.101 through 10.25.144.250) newly allocated to the local network A to the ARP table of the router 21*a* in a way that associates all of these IP addresses with the MAC address (00:11:22:33:44:55) of the testing apparatus 10*a*. Similarly, the ARP table setting unit 53 adds the IP address group ((10.25.165.101 through 10.25.165.250) newly allocated to the local network B to the ARP table of the router 21*b* in a way that associates all of these IP addresses with the MAC address (66:77:88:99:AA:BB) of the testing apparatus 10*b*. This setting enables all of the test packets to be transmitted and received between the testing apparatuses 10*a* and 10*b* and also enables a transfer of the unnecessary ARP request into the respective local networks A and B to be prevented.

The testing apparatus control unit 57 controls the transmission-and-reception processing unit 55 to thereby transmit all of the inputted verification conditions to the testing apparatuses 10*a*, 10*b*, respectively. Thereafter, when the test start event is inputted from on the operation screen etc, the testing apparatus control unit 57 receives this event and notifies the testing apparatuses 10*a*, 10*b* of the start of the test.

In each of the testing apparatuses 10*a*, 10*b*, the test packet generating unit 12, when receiving the verification condition data via the transmission-and-reception processing unit 11, generates the test packets matching with the verification conditions. Specifically, the RTP is set as the protocol type, and hence the test packet generating unit 12 generates the packets having an RTP packet format. The test packet generating unit 12 generates the RTP packets by such a packet count (150) that source-destination pairs in the newly-allocated IP address group are not overlapped. For example, the testing apparatus 10*a* has the generation of the 150-pieces of RTP packets in which the addresses (10.25.144.101 through 10.25.144.250) are respectively set as the source IP addresses, and the addresses (10.25.165.101 through 10.25.165.250) are individually set as the destination IP addresses. By contrast, the testing apparatus 10*b* has the generation of the 150-pieces of RTP packets in which the addresses (10.25.165.101 through 10.25.165.250) are respectively set as the source IP addresses, and the addresses (10.25.144.101 through 10.25.144.250) are individually set as the destination IP addresses. Moreover, the items of data contained in data of the verification conditions are set in the TOS field and the TTL field of the IP header of each packet.

The testing apparatuses 10*a*, 10*b*, when the transmission-and-reception processing unit 11 receives the test start notification from the test management apparatus 5, simultaneously transmits the 150-pieces of test packets generated by the test packet generating unit 12. Note that the packets related to the same connection are sequentially transmitted at the transmission interval (20 ms) set in the verification conditions till the reception of an end instruction is given from the test management apparatus 5.

The test packets transmitted from the respective testing apparatuses are received by the testing apparatuses 10*a*, 10*b* in accordance with the already-updated ARP tables of the routers 21*a*, 21*b*. In each testing apparatus, when receiving the test packet, the quality measuring unit 16 measures the communication quality on the basis of the receiving state of the test packet. After the quality measuring unit 16 has measured the respective communication qualities with respect to the individual connections, the verification result generating unit 15 organizes and thus retains the quality measurement information thereof.

In the test management apparatus 5, the testing apparatus control unit 57, upon detecting the expiration of the test execution time, transmits the test ending notification to the testing apparatuses 10*a*, 10*b* via the transmission-and-reception processing unit 55. When the transmission-and-reception processing unit 11 of each of the testing apparatuses 10*a*, 10*b* receives this test ending notification, the quality information retained by the verification result generating unit 15 is transmitted to the test management apparatus 5. In the test management apparatus 5, the verification result output unit 58 collects the pieces of quality information measured by the testing apparatuses 10*a*, 10*b* and outputs a network verification result. The network verification result is finally displayed on the display etc of the test management apparatus 5.

\<Verification of Client-Server Communications\>

Next, operations of the test management apparatus 5 and the testing apparatuses 10*a*, 10*b* in the case of verifying the client-server communications, will be described with reference to FIG. 6. What can be presumed as an example in FIG. 6 is a case, in which a terminal device is newly provided in the local network A and accesses the server 25 connected to the local network B. The subnet address is set similarly to the example described above, in which the IP addresses (10.25.144.101 through 10.25.144.250) are scheduled to be newly allocated to the local network A. In the case of verifying the client-server communications, the testing apparatus 10 corresponding to a terminal device (client) scheduled to be newly provided is connected to the local network A, and the testing apparatus 10b corresponding to the testing target server is connected to the local network B. In this case, the server 25, which is actually in operation, may be utilized as it is without using the testing apparatus 10b corresponding to the testing target server.

In the test management apparatus 5, the user inputs the IP addresses scheduled to be newly allocated, the IP address of the testing apparatus 10b (or the server 25) and the HTTP as the protocol type. Similarly, the MAC address of the testing apparatus 10a connected to the local network A is inputted. In the verification of the client-server communications, only the ARP table of the router 21a connected to the network on the client side is updated, and hence it may be sufficient that only the MAC address of the testing apparatus 10a is inputted.

The subsequent operation of the test management apparatus 5 is the same as in the case of the peer-to-peer communications except such a point that the aging timer and the ARP table of the router 21a on one side are updated, and the verification condition data is transmitted to only the client-side testing apparatus 10a.

In the testing apparatus 10a, the test packet generating unit 12, when receiving the verification condition data via the transmission-and-reception processing unit 11, generates the packets having the HTTP packet format because of the HTTP being set as the protocol type. The test packet generating unit 12 generates the HTTP packets by a count corresponding to the number (150 pieces) of IP addresses that are newly allocated. To be specific, the testing apparatus 10a has the generation of 150-pieces of HTTP packets, in which the addresses (10.25.144.101 through 10.25.144.250) are respectively set as the source IP addresses, and the IP address of the testing apparatus 10b is set as the destination IP address.

The testing apparatus 10a, when the transmission-and-reception processing unit 11 receives the test starting notification from the test management apparatus 5, transmits the 150-pieces of test packets generated by the test packet generating unit 12 simultaneously (or at a predetermined interval as the alternative available). The test packets transmitted from the testing apparatus 10a are received by the testing apparatus 10b as the destination thereof.

In the testing apparatus 10b, the loop-back processing unit 17 accepts the test packet (HTTP packet) received by the transmission-and-reception processing unit 11, and generates the response test packet thereto. The loop-back processing unit 17 transmits this response test packet to the source IP address of the test packet.

In the testing apparatus 10a, when receiving the response test packet to the test packet transmitted previously, the quality measuring unit 16 measures the communication quality based on the receiving state of the response test packet. When the quality measuring unit 16 measures the respective communication qualities with respect to each connection, the verification result generating unit 15 organizes and thus retains these pieces of quality measurement information. Hereafter, these pieces of quality measurement information are, when the test execution time expires, collected by the test management apparatus 5 and output as the network verification result.

<Operation Flow>

Figure 7:
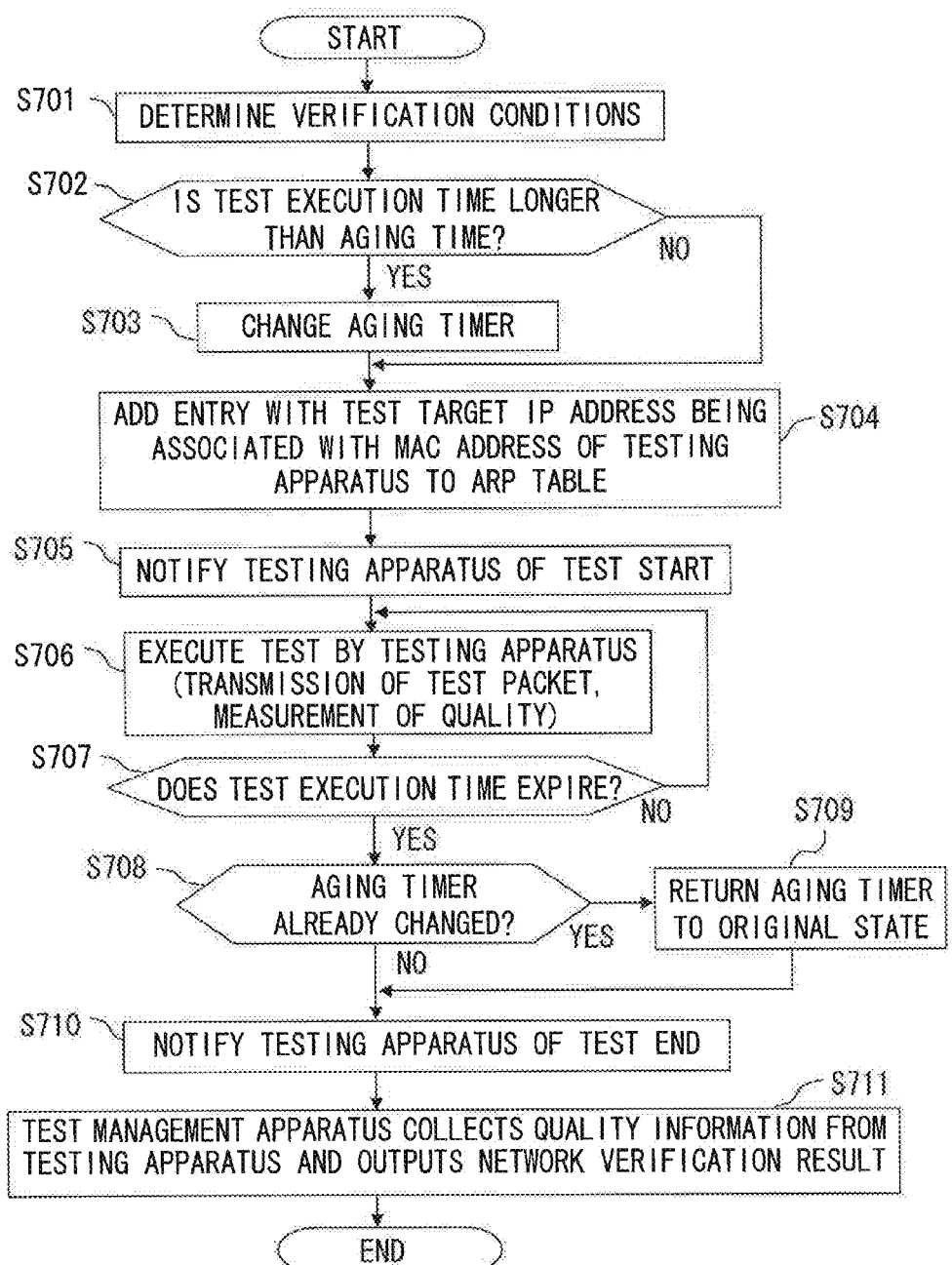
FIG. 7 is a flowchart illustrating an operation of each of apparatuses in the network verification system in the first embodiment.

An operation flow of the test management apparatus 5 and the testing apparatuses 10a, 10b on the occasion of performing the network verification described above will hereinafter be described with reference to FIG. 7. FIG. 7 is a flowchart illustrating the operation of each of the devices of the network verification system in the first embodiment, and illustrates the operation flow applied to any case of verifying the client-server communications and the peer-to-peer communications.

The test management apparatus 5 acquires the verification conditions on the occasion of implementing the network verification from the user such as the network administrator through the operation screen etc (S701). The test management apparatus 5 determines based on the protocol type set in the verification conditions whether the verification target communications are the peer-to-peer communications or the client-server communications. The test management apparatus 5 decides, based on the result of this determination, the router to update the ARP table. For example, both of the routers connected to the respective local networks are determined as target in the case of verifying the peer-to-peer communications, and the router connected to the client-side local network is determined as target in the case of verifying the client-server communications.

The test management apparatus 5 acquires the aging timer that is set in the target router, and determines whether or not the test execution time set in the verification conditions is longer than the aging timer (S702). The acquisition of the aging timer involves utilizing, e.g., the TELNET protocol. The test management apparatus 5, when determining that the test execution time is longer than the aging timer (S702; YES), sets the aging timer of the target router so as to be equal to or longer than the test execution time (S703). While on the other hand, the test management apparatus 5, when determining that the test execution time is equal to or shorter than the aging timer (S702; NO), makes no change in the aging timer.

The test management apparatus 5 subsequently adds, to the ARP table of the target router, an entry in which the test target IP address set in the verification conditions is associated with the MAC address of the testing apparatus set in the verification conditions (S704). Thereafter, the test management apparatus 5 notifies the target testing apparatus of the start of the test (S705). This notification may also be triggered by the user manipulating a test start button etc on the operation screen.

The testing apparatus, upon receiving a notification of test start from the test management apparatus 5, similarly generates and transmits the test packet matching with the verification conditions sent from the test management apparatus 5 (S706). The other testing apparatus receiving the test packet for the peer-to-peer communications or the transmission-side testing apparatus receiving the response test packet for the client-server communications, measures the communication quality on the basis of the test packet (S706). The testing apparatus continues to measure the communication qualities and retains the measurement results till the test management apparatus 5 notifies of the end of the test (S707; NO).

The test management apparatus 5 monitors an elapse of the test execution time set in the verification conditions (S707). The test management apparatus 5, when detecting the expiration of the test execution time (S707; YES), decides whether or not the aging timer of the target router is changed before starting the test (S708). The test management apparatus 5, if the aging timer is changed (S708; YES), returns the aging timer to a pre-changing value (S709).

Thereafter, the test management apparatus 5 notifies the testing apparatus of the end of the test (S710). The test management apparatus 5 collects the pieces of quality information measured and retained by the testing apparatus, and outputs the network verification result on the basis of the quality information (S711).

<Operation and Effect in First Embodiment>

In the network verification in the first embodiment, the testing apparatuses 10a, 10b are connected to the local networks which respectively become the test target networks and further connected to the test management apparatus 5 in the communication-enabled manner.

In the test management apparatus 5, the verification conditions needed for verifying the network are inputted, and all of the MAC addresses associated with the test target IP addresses are registered as the MAC addresses of the testing apparatuses in the ARP table of the receiving-side router so that all of the test packets are transferred to the testing apparatus in accordance with the verification conditions. Further, on the occasion of updating the ARP table, the aging timer is set equal to or longer than the test execution time.

This scheme, in the verifying method of the first embodiment, enables the occurrence of the ARP request to be prevented within the local network on the receiving side. Further, with this scheme, the receiving-side testing apparatus receives all of the test packets as far as there is no abnormality.

Accordingly, the network verification can be implemented without affecting the in-operation communication service within the test target local network.

Further, in the testing apparatus, the verification conditions etc. are notified from the test management apparatus 5, and the test packets matching with the verification conditions are generated and then transmitted. Moreover, in the other testing apparatus or the testing apparatus receiving the response test packet, the communication qualities (the loss, the delay, the fluctuation, etc) are measured corresponding to the received test packets.

This scheme enables the qualities of the plurality of connections to be measured by disposing only the single testing apparatus for every test target local network.

Second Embodiment

The network verification system in a second embodiment will hereinafter be discussed.

[Network Architecture]

Figure 8:
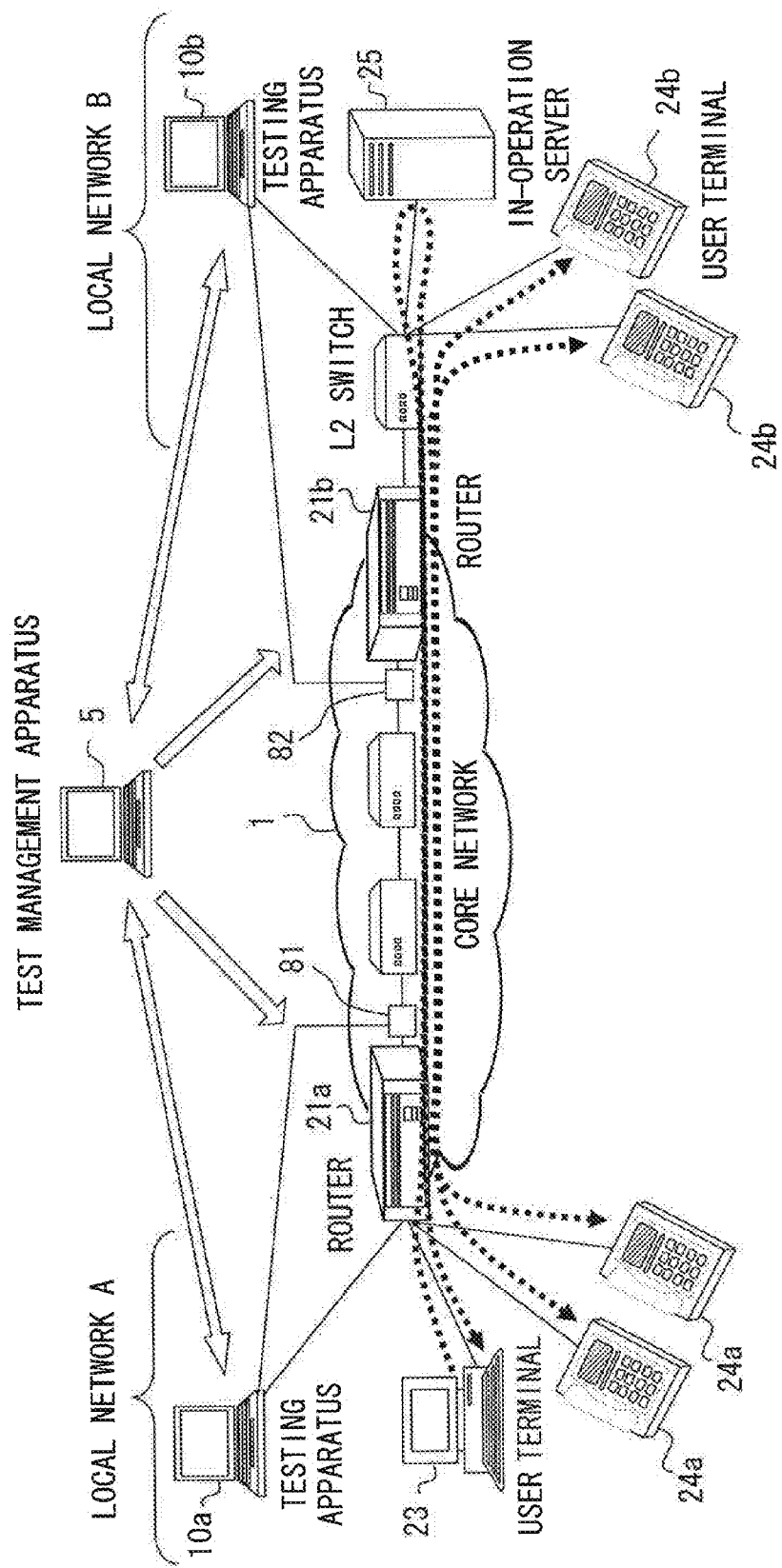
FIG. 8 is a diagram illustrating an example of the apparatus configuration of the network verification system in a second embodiment.

Configurations of the apparatuses in the network verification system in the second embodiment will hereinafter be described with reference to FIG. 8. FIG. 8 is a diagram illustrating an example of the configurations of the apparatuses in the network verification system in the second embodiment.

A scheme of the network verification system in the second embodiment is that only the testing apparatus receives the test packets by providing branching units at input ports of the routers. Accordingly, the apparatus configuration is the same as the example of the apparatus configuration in FIG. 1 except that branching units 81, 82 are provided, and communication lines branching at the branching unit 81, 82 are connected to the respective testing apparatuses 10a, 10b. What is the same as in FIG. 1 is omitted in explanation.

The branching units 81, 82 branch off the test packets at the input ports of the routers to which the test packets are inputted, thereby transferring the packets to the testing apparatuses on the receiving side. The branching units 81, 82 are exemplified by network taps (Layer-1 taps) and are defined as mirror ports having a port mirroring function. Another scheme of the network verification system in the second embodiment involves setting such a TTL value in the test packet that the test packet is discarded by the router on the receiving side. With this scheme, the test packets are received by only the testing apparatuses to which the test packets are branched by the branching units 81, 82 without affecting the in-operation apparatuses connected to the local networks.

[Apparatus Configuration]

The discussion will be focused on configurations, different from those in the embodiment, within the testing apparatuses 10a, 10b and the test management apparatus 5 in the network verification system in the second embodiment.

<Test Management Apparatus>

Figure 9:
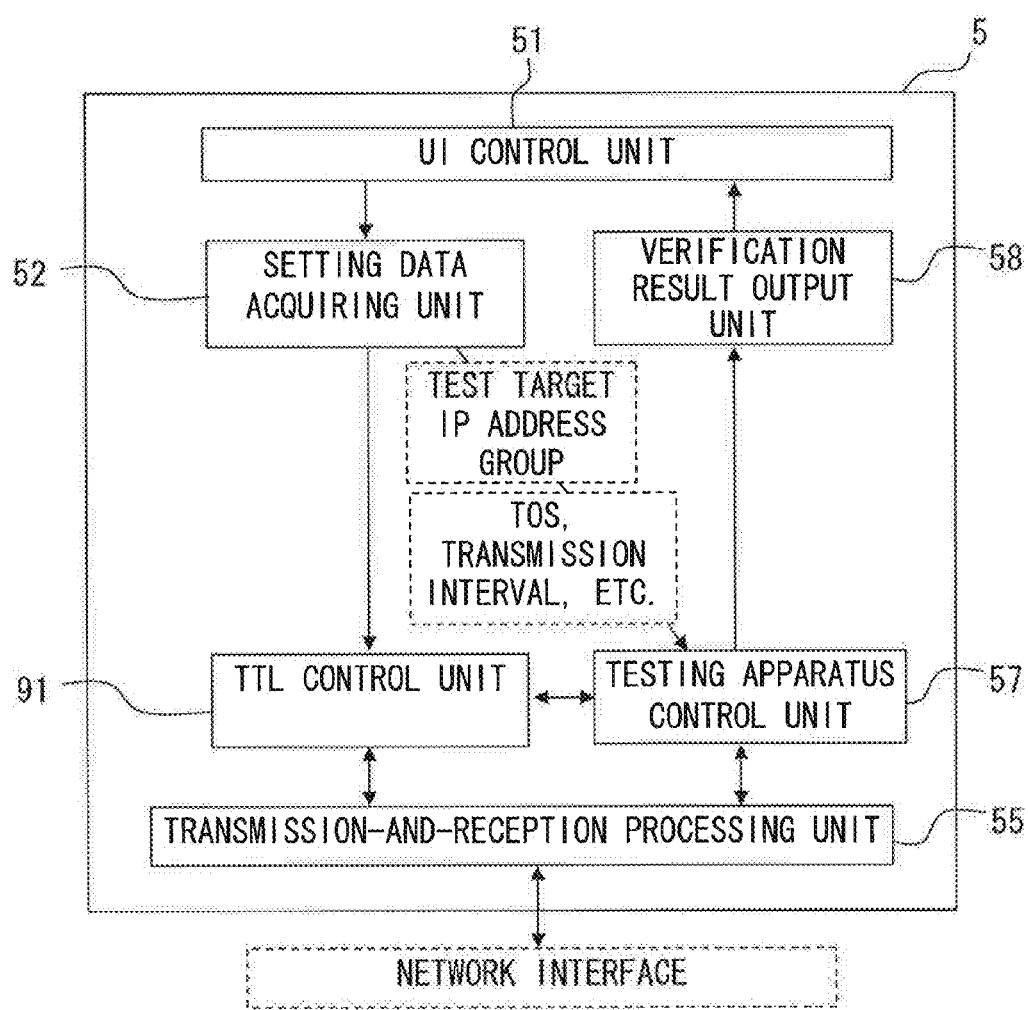
FIG. 9 is a block diagram illustrating a configuration of the test management apparatus in the second embodiment.

FIG. 9 is a block diagram illustrating a configuration of the test management apparatus in the second embodiment. The test management apparatus 5 in the second embodiment is the same as in the first embodiment except to provide a TTL control unit 91 in place of the ARP table setting unit 53 in the first embodiment.

The TTL control unit 91 instructs, through the transmission-and-reception processing unit 55, the testing apparatus to calculate a hop count up to the router to which the other testing apparatus is connected in order to determine the TTL value that is set in the test packet transmitted from the testing apparatus. The TTL control unit 91 receives, via the transmission-and-reception processing unit 55, a result of calculating the hop count from the testing apparatus. The TTL control unit 91 determines the thus-calculated hop count as the TTL value that is set in the test packet transmitted from the testing apparatus, and transmits this TTL value to the testing apparatus control unit 57. The testing apparatus control unit 57 notifies the testing apparatus of this TTL value together with other items of verification conditions.

The TTL control unit 91 further sets the router, to which the testing apparatus on the test packet receiving side is connected, so as not to forward a time-exceeded packet of an ICMP (Internet Control Message Protocol). This time-exceeded packet is a packet used for the router discarding the IP packet without forwarding this packet when the TTL value set in the forwarded IP packet becomes "0" to notify the packet transmission source of this purport. The TTL control unit 91 keeps this setting till the network verification test is completed in order to prevent other in-operation apparatuses from being affected by forwarding this time-exceeded packet.

<Testing Apparatus>

Figure 10:
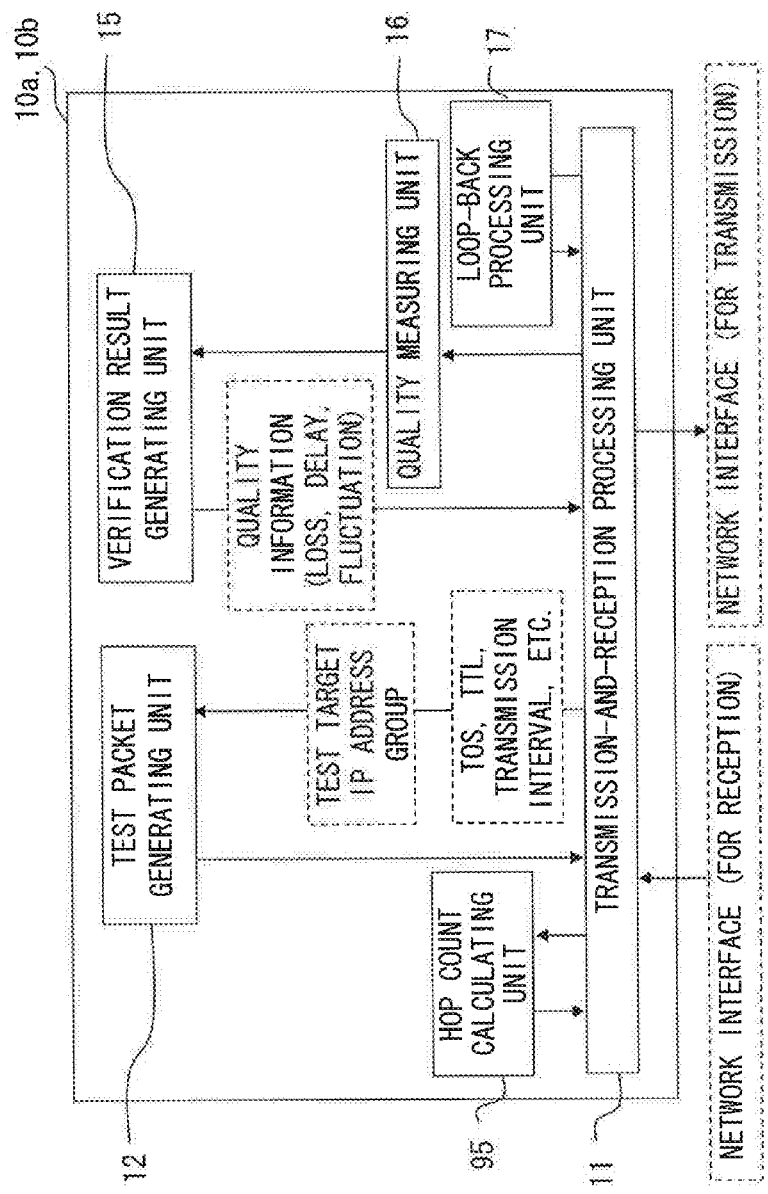
FIG. 10 is a block diagram illustrating a configuration of the testing apparatus in the second embodiment.

FIG. 10 is a block diagram illustrating a configuration of the testing apparatus in the second embodiment. The testing apparatus in the second embodiment includes, as a hardware configuration, at least two pieces of network interface cards for the transmission and the reception, which establish the connections to the networks, and newly includes a hop-count calculating unit 95 as the configuration, which is different from the first embodiment. In the testing apparatus in the second embodiment, the communication line branched by the branching unit 81 or 82 is connected to the reception network interface, and the communication line connected to the communication port of the router is connected to the transmission network interface.

The transmission-and-reception processing unit 11 controls the transmission network interface and the reception network interface, thereby executing a process of transmitting the transmission packet and a process of receiving the packet addressed to the self-device. Through this operation, the reception network interface is used for receiving the test packet, and the transmission network interface is employed for transmitting the test packet and the response test packet. Note that the transmission-and-reception processing unit 11 does not process the normal packets that are excluded from the test packets and the response test packets for the network verification but are not the packets addressed to the self-device.

The hop count calculating unit 95, when the transmission-and-reception processing unit 11 receives an instruction from the test management apparatus 5, executes a hop count calculating process. The hop count calculating unit 95 calculates a hop count up to the other test target local network. To be specific, the hop count calculating unit 95 calculates the hop count up to the edge router which connects the other local network to the core network by use of a command "traceroute". At this time, for example, the IP address of the edge router is designated as a destination IP address specified in the command "traceroute". The hop count calculating unit 95 sends the hop count calculated by use of the command "traceroute" to the test management apparatus 5.

Operational Example

Figure 11:
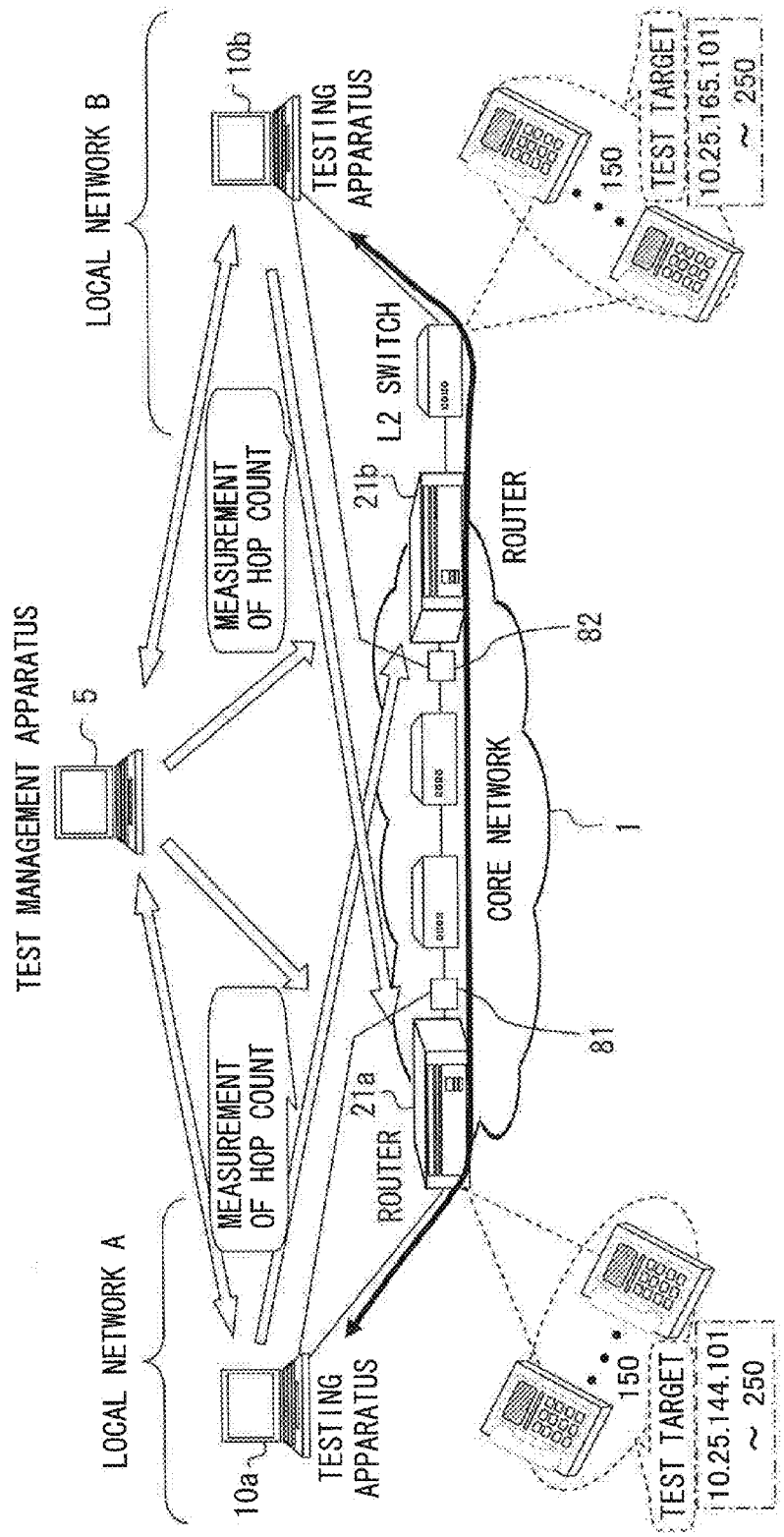
FIG. 11 is a diagram illustrating an example of verifying the peer-to-peer communications in the network verification system in the second embodiment.
Figure 12:
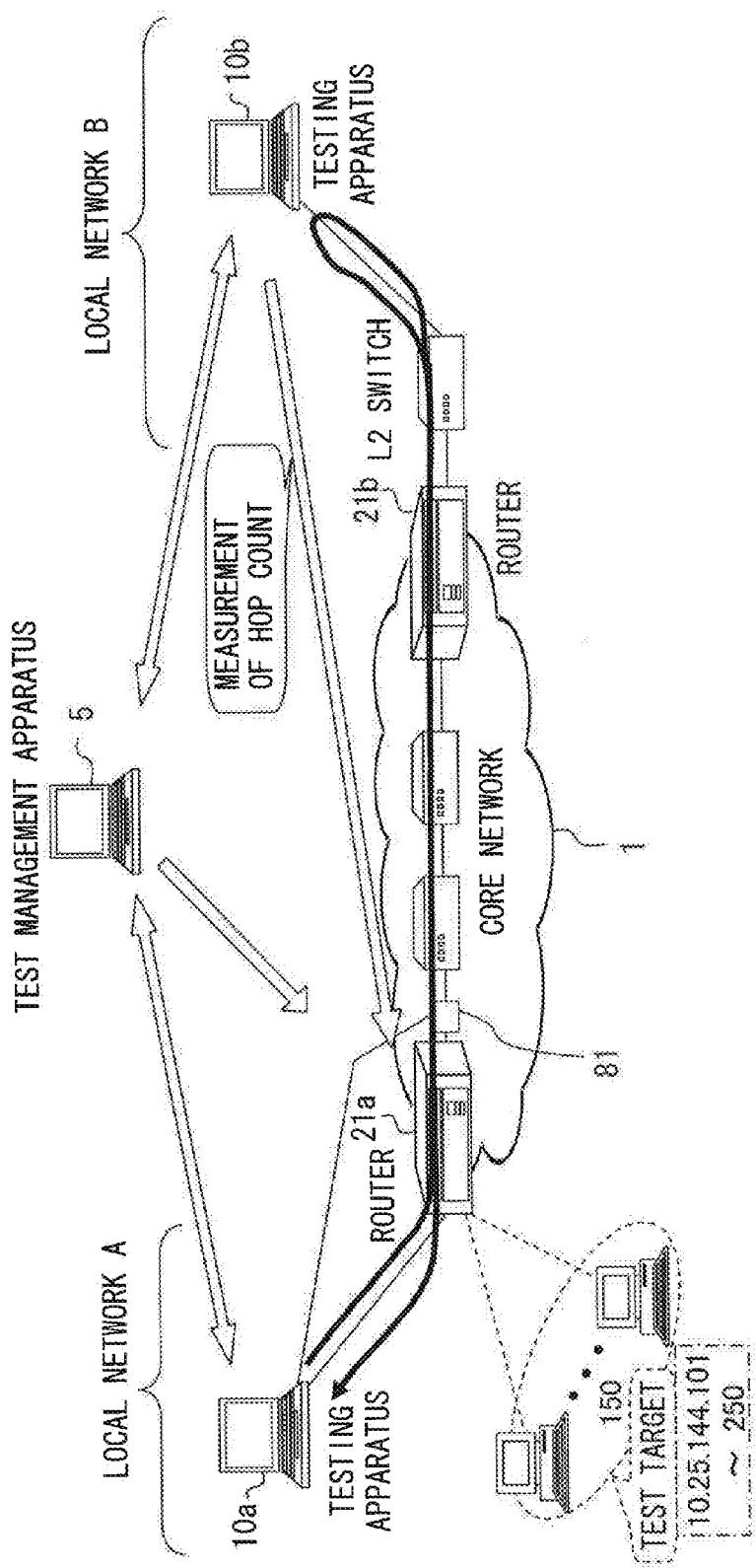
FIG. 12 is a diagram illustrating an example of verifying the client-server communications in the network verification system in the second embodiment.

An operational example of the test management apparatus 5 and the testing apparatuses 10*a*, 10*b* in the network verification system according to the second embodiment will hereinafter be described with reference to FIGS. 11 and 12. FIG. 11 is a diagram illustrating an example of verifying the peer-to-peer communications in the network verification system in the second embodiment. FIG. 12 is a diagram illustrating an example of verifying the client-server communications in the network verification system in the second embodiment.

<Verification of Peer-to-Peer Communications>

At first, the operations of the test management apparatus 5 and the testing apparatuses 10*a*, 10*b* in the case of implementing the verification of the peer-to-peer communications will hereinafter be described with reference to FIG. 11. An example in FIG. 11 is based on an assumption of the same situation as the example in FIG. 5 in the first embodiment. Specifically, the situation is that the IP addresses (10.25.144.101 through 10.25.144.250) are newly allocated to the local network A, and the IP addresses (10.25.165.101 through 10.25.165.250) are newly allocated to the local network B. On the occasion of implementing the network verification, the communication line branching at the branching unit 81 is connected to the reception network interface of the testing apparatus 10*a*, and the communication line connected to the communication port of the router 21*a* is connected to the transmission network interface of the testing apparatus 10*a*. Similarly, the communication line branching at the branching unit 82 is connected to the reception network interface of the testing apparatus 10*b*, and the communication line connected to the communication port of the router 21*b* is connected to the transmission network interface of the testing apparatus 10*b* via a L2 switch etc.

The items inputted by the user (the network administrator etc) onto the operation screen displayed on the display etc of the test management apparatus 5 are the newly allocated IP addresses, the RTP as the protocol type, the value (5) representing the top priority as the TOS, 20 ms as the transmission interval and 10 min as the test execution time. Further, The IP addresses of the edge routers 21*a*, 21*b* are inputted, respectively. In the test management apparatus 5, these inputted verification conditions are transmitted to the setting data acquiring unit 52 from the UI control unit 51 and further transmitted to the TTL control unit 91 and the testing apparatus control unit 57.

The TTL control unit 91 instructs the testing apparatuses 10*a*, 10*b* to calculate the hop counts up to the local networks considered mutually as the receiving sides through the transmission-and-reception processing unit 55. The TTL control unit 91 notifies of the IP addresses of the target routers together with this instruction.

In each of the testing apparatuses 10*a*, 10*b*, the hop count calculating unit 95 receiving the instruction from the transmission-and-reception processing unit 11 calculates the hop count up to the router connected to the receiving-side local network by use of the command "traceroute". The hop count calculating unit 95 sends the calculated hop count to the test management apparatus 5.

In the test management apparatus 5, the TTL control unit 91, when receiving the respective hop counts from the testing apparatuses 10*a*, 10*b*, determines, as the hop counts, the TTL values that is set in the respective test packets transmitted from the testing apparatuses 10*a*, 10*b*. The determined TTL values are transmitted to the testing apparatus control unit 57.

The TTL control unit 91, upon determining the TTL values, sets the routers 21*a*, 21*b* so as not to forward the time-exceeded packets of the ICMP. With this setting, the test packets received by the testing apparatuses 10*a*, 10*b* are discarded because of the TTL values reaching "0", and the time-exceeded packets are not forwarded with this discard.

The testing apparatus control unit 57 controls the transmission-and-reception processing unit 55 to transmit the inputted verification conditions and the TTL values determined by the TTL control unit 91 to the testing apparatuses 10*a*, 10*b*, respectively. Thereafter, when the test start event is inputted from on the operation screen etc, the testing apparatus control unit 57 receives this event and notifies the testing apparatuses 10*a*, 10*b* of the start of the test.

In each of the testing apparatuses 10*a*, 10*b*, the test packet generating unit 12, when receiving the verification conditions data via the transmission-and-reception processing unit 11, generates the test packets matching with the verification conditions. The TTL value (which is the hop count up to the router connected to the local network on the receiving side) determined by the test management apparatus 5 is set as the TTL value of the test packet. Other items pertaining to the test packet are the same as in the first embodiment.

The testing apparatuses 10*a*, 10*b*, when the transmission-and-reception processing unit 11 receives the test start notification from the test management apparatus 5, simultaneously transmit the 150-pieces of test packets generated by the test packet generating unit 12. Note that the packets related to the same connection are sequentially transmitted at the transmission interval (20 ms) set in the verification conditions till end instruction is given from the test management apparatus 5.

The test packets transmitted from the respective testing apparatuses are branched at the branching unit 81 or 82 and received by the testing apparatuses 10*a* and 10*b*. The test packets received at the normal communication port of the router 21*a* or 21*b* are discarded by the router 21*a* or 21*b* because of the TTL values of the packet reaching "0". This is because the hop count up to the edge router is set as the TTL value of the test packet. With this scheme, the test packets are received by only the testing apparatuses 10*a*, 10*b* but not forwarded to the local networks A and B.

The subsequent operations are the same as those in the first embodiment. Namely, in each testing apparatus, the communication quality is measured based on the receiving state of the test packet received via the branching unit 81 or 82, and the quality measurement information is transmitted to the test management apparatus 5 when the test execution time expires.

<Verification of Client-Server Communications>

Next, the operations of the test management apparatus 5 and the testing apparatuses 10*a*, 10*b* in the case of implementing the verification of the client-server communications will hereinafter be described with reference to FIG. 12. An example in FIG. 12 is based on an assumption of the same situation as the example in FIG. 6 in the first embodiment. Specifically, the situation is that the IP addresses (10.25.144.101 through 10.25.144.250) are newly allocated to the local network A. The network verification involves providing the branching unit 81 on the side of only the local network A to which the testing apparatus 10*a* corresponding to the client is connected, connected to the branched communication line to the reception network interface of the testing apparatus 10*a*, and connecting the communication line connecting with the communication port of the router 21*a* to the transmission network interface of the testing apparatus 10*a*. On the other hand, the testing apparatus 10*b* corresponding to the test target server is connected to the local network B.

In the test management apparatus 5, the user inputs the IP addresses scheduled to be newly allocated, the IP address of the testing apparatus 10*b* and the HTTP as the protocol type. Further, the IP address of the router 21*a* connected to the local network A is also inputted. In the verification of the client-server communications, the branching unit 81 is installed only at the router 21*a* connected to the network on the client side, and hence it may be sufficient that only the IP address of the router 21*a* is inputted.

The subsequent operations of the test management apparatus 5 and the testing apparatuses 10*a*, 10*b* are the same as in the case of the client-server communications in the first embodiment except to change the setting for only the router 21*a* to forward the time-exceeded packet, to calculate only the hop count up to the router 21*a* by the testing apparatus 10*b* and to notify the testing apparatus 10*b* of the TTL value set to the hop count.

In the testing apparatus 10*a*, the test packet generating unit 12, when receiving the verification condition data through transmission-and-reception processing unit 11, generates the testing HTTP packets corresponding to the number (150-pieces) of IP addresses to be newly allocated. The testing apparatus 10*a*, when the transmission-and-reception processing unit 11 receives the test start notification from the test management apparatus 5, transmits the 150-pieces of test packets generated by the test packet generating unit 12 simultaneously (or at the predetermined interval as the alternative available). The test packets transmitted from the testing apparatus 10*a* are received by the testing apparatus 10*b* as the destination thereof.

In the testing apparatus 10*b*, the loop-back processing unit 17 accepts the test packet (HTTP packet) received by the transmission-and-reception processing unit 11, and generates the response test packet thereto in a way that sets the TTL value determined by the TTL control unit. The loop-back processing unit 17 transmits this response test packet to the source IP address of the test packet.

This response test packet is branched at the branching unit 81 and received by the testing apparatus 10*a*. On the other hand, the response test packet received by the normal communication port of the router 21*a* is discarded by the router 21*a* because of the TTL value reaching "0". The testing apparatus 10*a* receiving the response test packet measures the communication quality on the basis of the receiving state of the response test packet. Hereafter, the pieces of quality measurement information are, upon the expiration of the test execution time, collected and output as a result of the network verification by the test management apparatus 5.

<Operation Flow>

Figure 13:
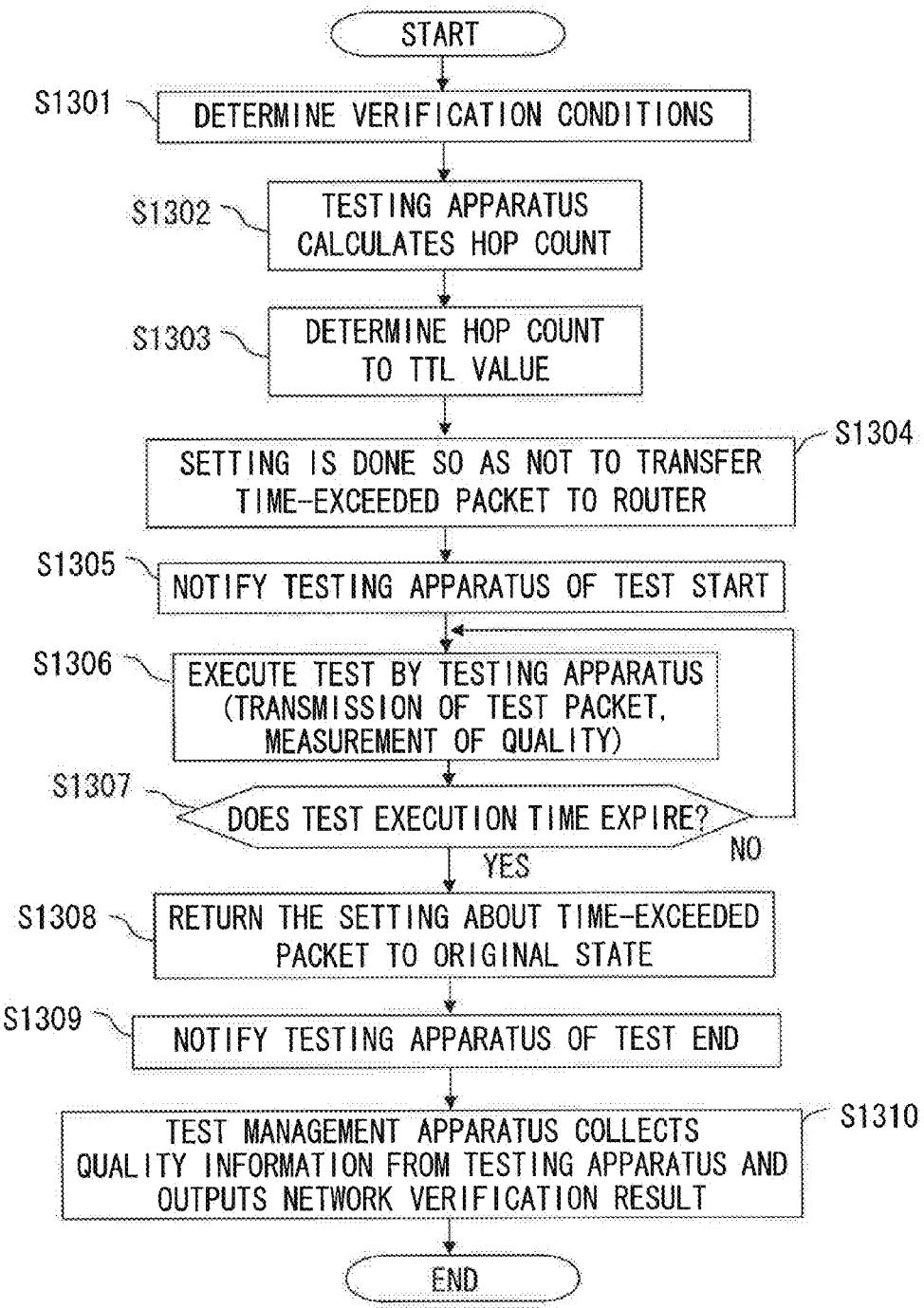
FIG. 13 is a flowchart illustrating the operation of each of the apparatuses in the network verification system in the second embodiment.

An operation flow of the test management apparatus 5 and the testing apparatuses 10*a*, 10*b* on the occasion of performing the network verification described above will hereinafter be described with reference to FIG. 13. FIG. 13 is a flowchart illustrating the operation of each of the apparatuses of the network verification system in the second embodiment, and illustrates the operation flow applied to any case of verifying the client-server communications and the peer-to-peer communications.

The test management apparatus 5 acquires the verification conditions on the occasion of implementing the network verification from the user such as the network administrator through on the operation screen etc (S1301). The test management apparatus 5 determines based on the protocol type set in the verification conditions whether the verification target communications are the peer-to-peer communications or the client-server communications. The test management apparatus 5 decides, based on the result of this determination, the router to conduct the setting about the time-exceeded packet. For example, both of the routers connected to the respective local networks are determined as the target in the case of verifying the peer-to-peer communications, and the router connected to the client-side local network is determined as the target in the case of verifying the client-server communications.

The test management apparatus 5 instructs the testing apparatus to calculate the hop count up to the target router (S1302). At this time, the IP address of the target router is notified, simultaneously. In the testing apparatus, the hop count up to the target router is thereby calculated in a way that uses the command "traceroute" etc.

The thus-calculated hop count is transmitted to the test management apparatus 5, and the test management apparatus 5 determines the hop count to the TTL value that is set in the test packet or the response test packet (S1303). The test management apparatus 5 sends the determined TTL value together with other items of verification conditions to the testing apparatus.

The test management apparatus 5 further sets the target router so as not to forward the time-exceeded packet (S1304). The test management apparatus 5 sets the respective routers 21*a*, 21*b* connected to the testing apparatuses 10*a*, 10*b* in the case of verifying the peer-to-peer communications, and sets only the router 21*a* connected to the testing apparatus 10*a* on the client side in the case of verifying the client-server communications.

The testing apparatus, when receiving the test start notification from the test management apparatus 5, similarly generates and transmits the test packets matching with the verification conditions sent from the test management apparatus 5 (S1305). The test packets are branched at the branching unit 81 or 82 and received by the other testing apparatus. The test packets forwarded to the router without being branched are discarded because of the TTL values reaching "0". The other testing apparatus receiving the test packet or the transmitting-side testing apparatus receiving the response test packet, measures the communication quality based on, if the test packet is the test packet for the peer-to-peer communications or the response test packet for the client-server communications, this test packet (S1306). The testing apparatus continues to measure the communication quality till the test ending notification is sent from the test management apparatus 5 (S1307; NO) and retains a measuring result.

The test management apparatus 5 monitors the elapse of the test execution time set in the verification conditions (S1307). The test management apparatus 5, when detecting the expiration of the test execution time (S1307; YES), returns the setting for the target router to forward the time-exceeded packet to the original status (S1308). Namely, the setting is done so as to forward the time-exceeded packet.

Thereafter, the test management apparatus 5 notifies the testing apparatus of the end of the test (S1309). The test management apparatus 5 collects the pieces of quality information measured and retained by the testing apparatus, and outputs a result of the network verification on the basis of the quality information (S1310).

<Operation and Effect in Second Embodiment>

In the network verification system in the second embodiment, the testing apparatuses 10a, 10b are connected respectively to the test target local networks, and further the test management apparatus 5 is connected in the communication-enabled manner to these testing apparatuses 10a, 10b. In the second embodiment, the testing apparatus on the side of receiving the test packets is connected via the reception network interface to the communication line branching at the branching unit installed anterior to the normal communication port of the router, and is connected via the transmission network interface to the communication line connected to the normal communication port of the router.

In the testing apparatus, the hop count up to the router connected to the local network as the destination of the communications, is calculated based on the instruction given from the test management apparatus 5, and the test management apparatus 5 is notified of the calculated hop count. In the test management apparatus 5, the TTL value is determined based on this calculated hop count and sent together with other items of verification conditions to the testing apparatus. In the testing apparatus, the test packet in which the TTL value is set or the response test packet is transmitted.

With this scheme, according to the second embodiment, the test packet transmitted from the testing apparatus and received by the router connected to the local network as the destination of the communications, is discarded when the TTL value thereof reaches "0". Namely, the testing apparatus receives only the test packet branching at the branching unit installed in front of the normal communication port of the router.

Accordingly, the test packet is not forwarded within the test target local network, and hence the network verification can be implemented without affecting the in-operation communication service.

Further, in the second embodiment, the test management apparatus 5 performs the setting for the router connected to the testing apparatus enabled to become the receiving side so as not to forward the time-exceeded packet.

With this scheme, even when the test packet is discarded by the router due to the TTL value, it does not happen that the time-exceeded packet for notifying of this discard is not forwarded to the originating local network. It is therefore feasible to further reduce the influence on the in-operation communication service in terms of implementing the network verification.

Modified Example

Figure 14:
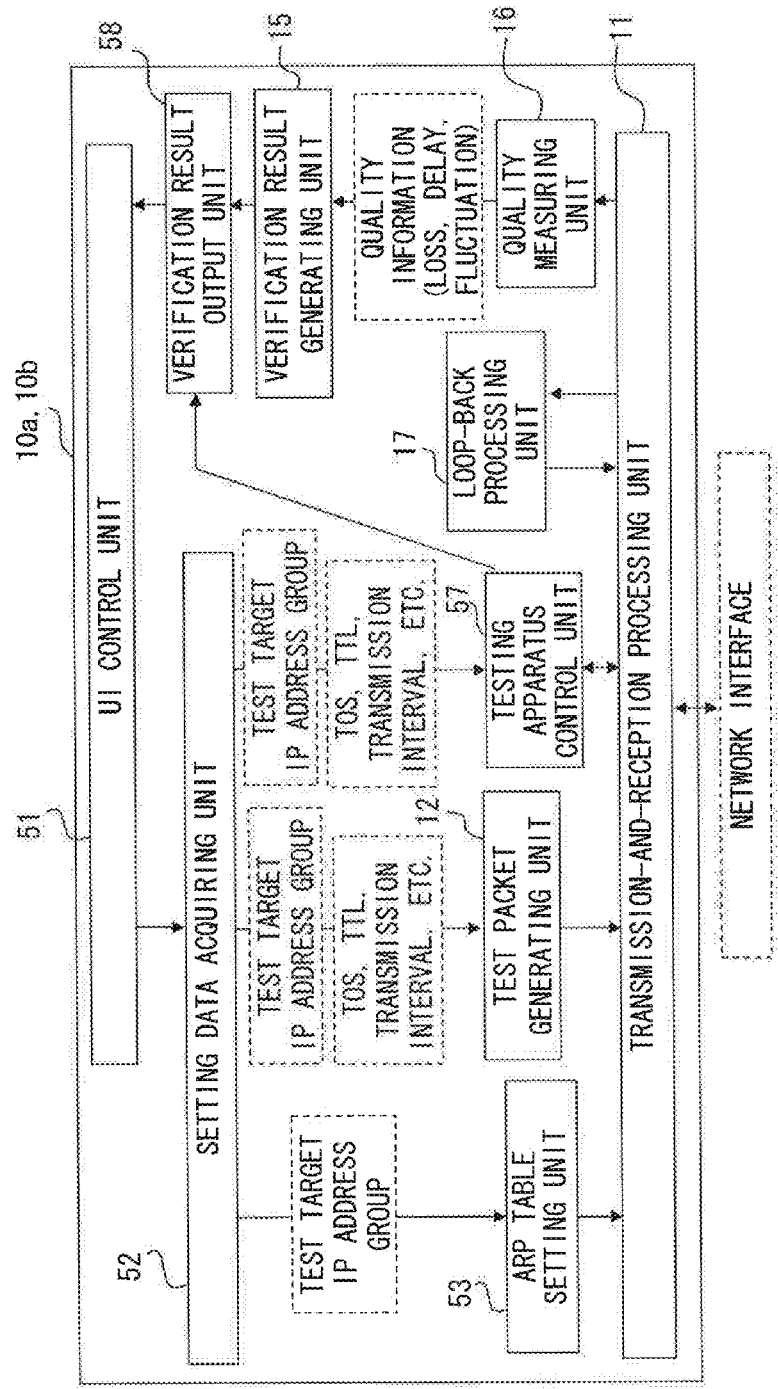
FIG. 14 is a block diagram illustrating a configuration of the testing apparatus in a modified example of the first embodiment.
Figure 15:
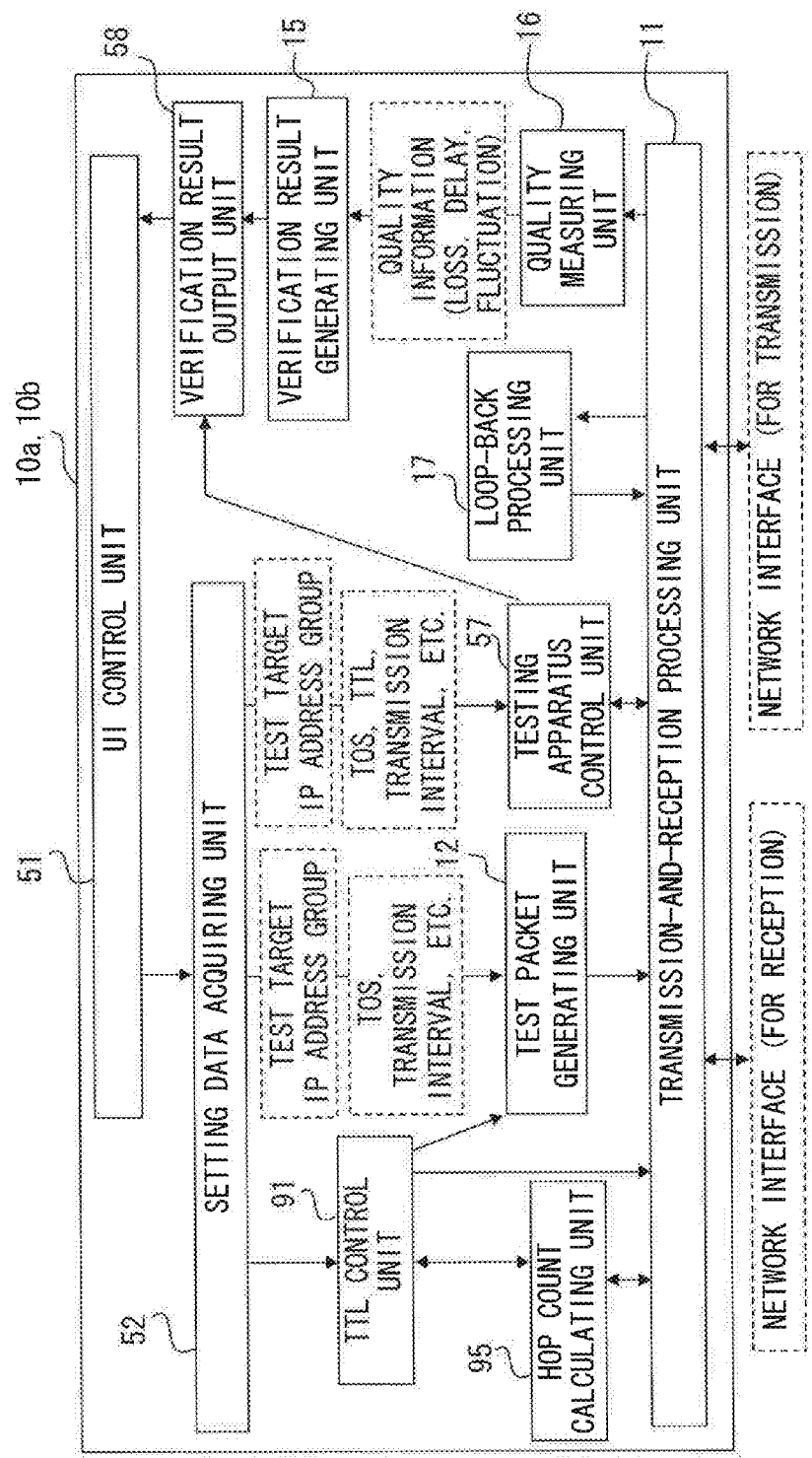
FIG. 15 is a block diagram illustrating a configuration of the testing apparatus in a modified example of the second embodiment.
Figure 16:
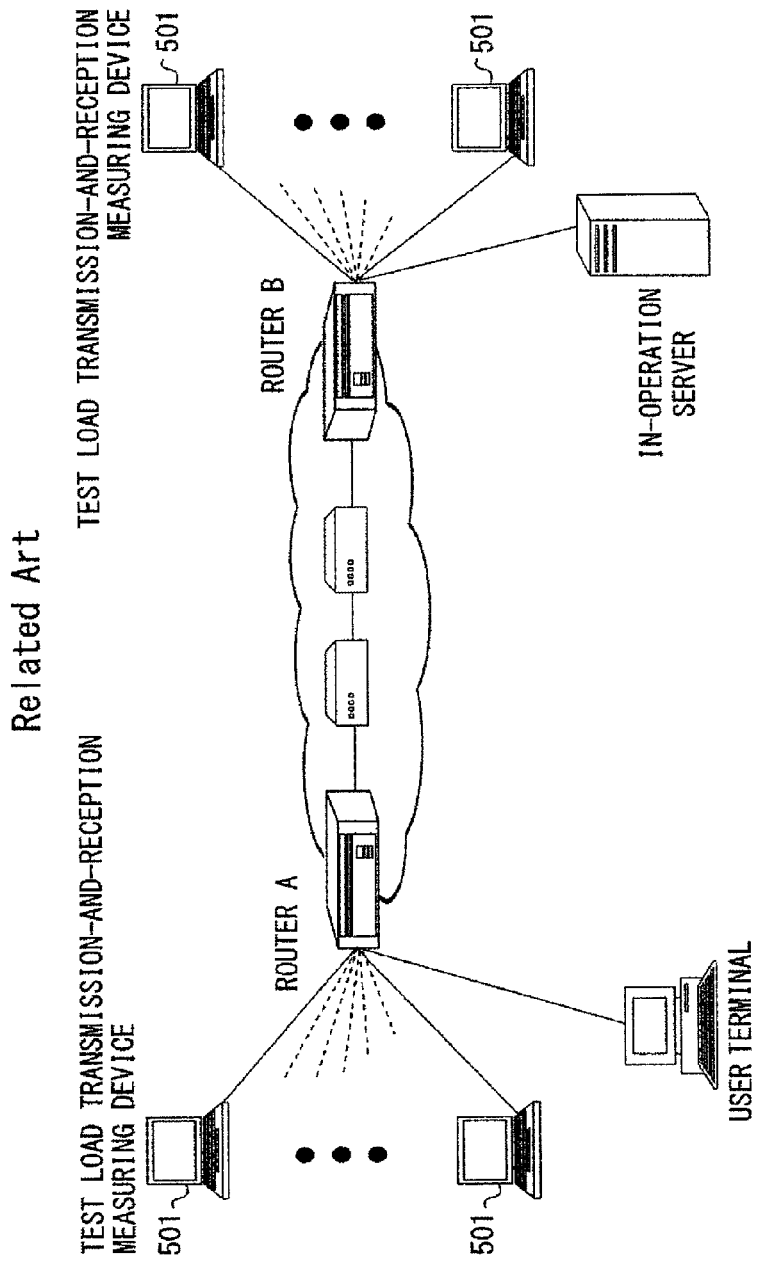
FIG. 16 is a diagram illustrating an example of a conventional network quality test.
Figure 17:
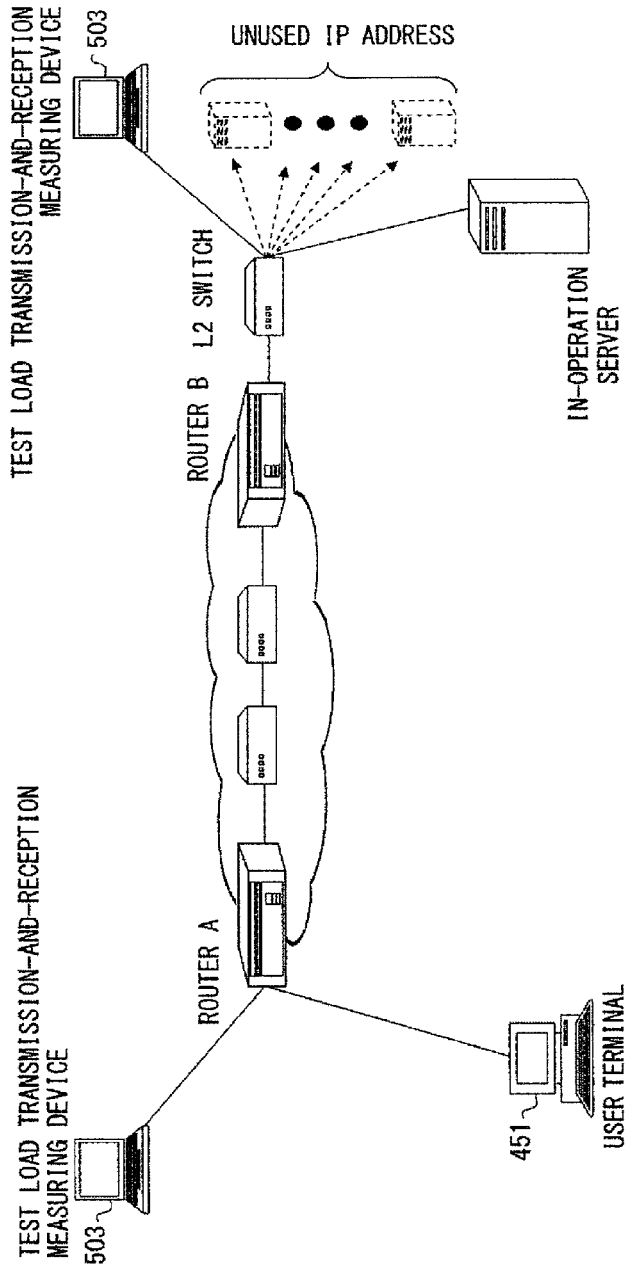
FIG. 17 is a diagram illustrating an example of the conventional network quality test.

In the first and second embodiments discussed above, the network verification is conducted by the test management apparatus 5 and the testing apparatuses 10a, 10b, however, any one of the testing apparatuses 10a, 10b may include all or a part of the units of the test management apparatus 5. FIG. 14 is a block diagram illustrating a configuration of the testing apparatus in a modified example of the first embodiment. FIG. 15 is a block diagram illustrating a configuration of the testing apparatus in a modified example of the second embodiment. FIGS. 14 and 15 illustrate the examples of the configurations of the testing apparatuses each having all of the units of the test management apparatus 5.

In the modified example of the first embodiment, the testing apparatus executes the process of setting the ARP table (the ARP table setting unit 53) and collects the network verification results (the testing apparatus control unit 57) generated by the other testing apparatus. The testing apparatus has the user interface, then acquires the setting data containing the verification conditions via the user interface, and further outputs the network verification result. Moreover, the testing apparatus monitors the test execution time and notifies another testing apparatus of the end of the test (the testing apparatus control unit 57).

In the modified example of the second embodiment, the testing apparatus conducts the determining of the TTL value and the setting for inhibiting the router from forwarding the time-exceeded packet (the TTL control unit 91).

The embodiments discussed above may further include following configurations. Modes disclosed in respective configurations can be combined to the greatest possible degree as the necessity arises.

a first mode of the embodiment is a network verification system, including a testing apparatus which transmits and receives a test packet and a test management apparatus, for verifying a network to which a relay apparatus relays a packet, wherein the test management apparatus includes: a condition acquiring unit to acquire verification conditions for verifying the network, which contain an unused network address as a test target; a registering unit to register, in an address resolution table of the relay apparatus relaying the packet to the network in which the testing apparatus is disposed, an entry in which the unused network address contained in the verification conditions acquired by the condition acquiring unit is associated with a physical address of the testing apparatus; and an instructing unit to instruct, after the registering unit has registered the entry, the testing apparatus to transmit and receive the test packet, and the testing apparatus includes: a test packet transmitting unit to transmit, when instructed by the instructing unit, the plurality of test packets to form a plurality of connections on the basis of the verification conditions; a test packet receiving unit to receive the plurality of test packets; and a measuring unit to measure communication qualities with respect to the respective connections of the plurality of test packets received by the test packet receiving unit.

Herein, the relay apparatus is, e.g., a router. The address resolution table is, e.g., an ARP table. The physical address is, for example, a MAC address, and the network address is, for instance, an IP address. Further, the unused network address connotes a network address that is not yet used in the existing apparatus within the network.

According to the first mode of the embodiment, before transmitting and receiving the test packet, the entry in which the test target unused network address is associated with the physical address of the testing apparatus, is registered in the address resolution table of the relay apparatus. With this scheme, even the test packet in which the not-yet-set network address is set is relayed by the relay apparatus on the basis of the address resolution table and received by the testing apparatus.

Accordingly, even when the test packet for the network verification is transmitted, a transfer of the packet for the address resolution accompanying the transmission of this test packet is not carried out, and it is therefore possible to implement the network verification without burdening an unnecessary load on the existing system.

Moreover, in the first mode of the embodiment, the network verification is conducted by the testing apparatuses and the test management apparatus and can therefore be attained with a simple configuration.

Further, in the first mode of the embodiment, preferably, the test management apparatus further includes a changing unit to change setting of the relay apparatus so that the entry registered by the registering unit is not erased by an auto-updating function of the address resolution table of the relay apparatus relaying the packet to the network in which the testing apparatus is disposed.

Herein, the address resolution auto-updating function is, e.g., an aging function held by the router. This function enables the address resolution packet from being transferred due to deletion of the entry registered in the address resolution table.

Moreover, in the first mode of the embodiment, preferably, the condition acquiring unit of the test management apparatus acquires the verification conditions further containing a protocol type, the registering unit of the test management apparatus determines the relay apparatus of which the address resolution table is updated corresponding to the protocol type contained in the verification conditions, and the testing apparatus further includes a loop-back unit to transmit, if the protocol type set in the test packet received by the test packet receiving unit is a predetermined protocol, a response test packet as a response to the received packet toward a source network address of the received packet.

Herein, the predetermined protocol is, e.g., a client-server protocol, i.e., an HTTP, an FTP, etc. With this definition, if the protocol type contained in the verification conditions is a client-server protocol, it follows that only the address resolution table of the relay apparatus, to which the client-side testing apparatus is connected, is updated.

Accordingly, the network verification can be implemented without conducting unnecessary setting.

Moreover, in the first mode of the embodiment, preferably, the condition acquiring unit of the test management apparatus acquires the verification conditions further containing a transmission interval, the test packet transmitting unit of the testing apparatus transmits the plurality of test packets of each connection at the transmission interval contained in the verification conditions, and the measuring unit of the testing apparatus measures a loss by detecting a missing sequence number that is to be set in a header of the test packet, measures a delay on the basis of a timestamp set in the header, and measures a fluctuation from a variation of an interval of receiving the test packets.

According to this configuration, in the case of setting such a protocol (e.g., an RTP (Real-time Transport Protocol)) that a transmission interval is predetermined as the test target, the test packets can be transmitted at the transmission interval. Moreover, the proper communication quality can be measured based on the receiving state of this test packet.

A second mode of the embodiment is a network verification system, including a testing apparatus which transmits and receives a test packet and a test management apparatus, for verifying a network to which a relay apparatus relays the packet, wherein the test management apparatus includes: a setting unit to conduct setting for inhibiting the relay apparatus from forwarding a time-exceeded packet; and an instructing unit to instruct, after the setting unit has completed the setting, the testing apparatus to transmit and receive the test packet, the testing apparatus includes: a calculating unit to calculate a hop count up to the relay apparatus; a test packet transmitting unit to transmit, when instructed by the instructing unit, the test packet in which the hop count calculated by the calculating unit is set in TTL (Time To Live); and a test packet receiving unit to receive the test packet via a branching unit to branch the test packet before being inputted to the relay apparatus.

According to the second mode of the embodiment, the testing apparatus receives the test packet via the branching unit that branches the test packet before being inputted to the relay apparatus. On the other hand, the test packet inputted to the relay apparatus is discarded by this relay apparatus because of the TTL value being set to the hop count calculated by the calculating unit. Namely, the testing apparatus receives only the test packet branched by the branching unit.

Accordingly, the test packets are not unnecessarily forwarded within the network, and hence the network verification can be implemented without affecting the in-operation communication service.

Furthermore, in the second mode, the setting for inhibiting the relay apparatus from forwarding the time-exceeded packet is done, so that even when the test packet is discarded by the relay apparatus due to the TTL value, the time-exceeded packet for notifying of this discard is not transferred to the source. Accordingly, the influence on the in-operation communication service can be further reduced in terms of performing the network verification.

It should be noted that the embodiment may also be a method of making a computer realize at least one of the configurations described above. Further, the embodiment may also be a program for realizing at least one of the configurations described above. Still further, the embodiment may also be a storage medium recorded with such a program that can be read by the computer.

According to the embodiment, it is feasible to actualize the network verification system which previously verifies the network without affecting the in-operation communication service with the simple configuration.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A network verification management apparatus controlling a testing apparatus which transmits and receives a test packet and verifying a network to which a relay apparatus relays a packet, the network verification management apparatus comprising:
    a condition acquiring unit to acquire verification conditions for verifying the network by user input and/or by communicating with the testing apparatus, wherein the verification conditions include a test target network address which is to be set in the test packet;
    a registering unit to register, in an address resolution table of the relay apparatus relaying the packet to the network in which the testing apparatus is disposed, an entry in which the test target network address contained in the verification conditions acquired by the condition acquiring unit is associated with a physical address of the testing apparatus; and
    a control unit to control the testing apparatus to transmit and receive a plurality of test packets to form a plurality of connections on the basis of the verification conditions acquired by the condition acquiring unit after the registering unit has registered the entry.

2. The network verification management apparatus according to claim 1, further comprising
    a changing unit to change setting of the relay apparatus so that the entry registered by the registering unit is not erased by an auto-updating function of the address resolution table of the relay apparatus relaying the packet to the network in which the testing apparatus is disposed.

3. A network verification system, including a testing apparatus which transmits and receives a test packet and a test management apparatus, for verifying a network to which a relay apparatus relays a packet, the test management apparatus comprising:
- a condition acquiring unit to acquire verification conditions for verifying the network by user input and/or by communicating with the testing apparatus, wherein the verification conditions include a test target network address as a test target;
- a registering unit to register, in an address resolution table of the relay apparatus relaying the packet to the network in which the testing apparatus is disposed, an entry in which the test target network address contained in the verification conditions acquired by the condition acquiring unit is associated with a physical address of the testing apparatus; and
- an instructing unit to instruct, after the registering unit has registered the entry, the testing apparatus to transmit and receive the test packet, the testing apparatus comprising:
- a test packet transmitting unit to transmit, when instructed by the instructing unit, a plurality of test packets to form a plurality of connections on the basis of the verification conditions;
- a test packet receiving unit to receive the plurality of test packets; and
- a measuring unit to measure communication qualities, with respect to the respective connections of the plurality of test packets received by the test packet receiving unit.

4. The network verification system according to claim 3, wherein the test management apparatus further comprises a changing unit to change setting of the relay apparatus so that the entry registered by the registering unit is not erased by an auto-updating function of the address resolution table of the relay apparatus relaying the packet to the network in which the testing apparatus is disposed.

5. The network verification system according to claim 3, wherein the condition acquiring unit of the test management apparatus acquires the verification conditions further containing a protocol type, the registering unit of the test management apparatus determines the relay apparatus of which the address resolution table is updated corresponding to the protocol type contained in the verification conditions, and the testing apparatus further comprises a loop-back unit to transmit, if the protocol type set in the test packet received by the test packet receiving unit is a predetermined protocol, a response test packet as a response to the received packet toward a source network address of the received packet.

6. The network verification system according to claim 3, wherein the condition acquiring unit of the test management apparatus acquires the verification conditions further containing a transmission interval, the test packet transmitting unit of the testing apparatus transmits the plurality of test packets of each connection at the transmission interval contained in the verification conditions, and the measuring unit of the testing apparatus measures a loss by detecting a missing sequence number that is to be set in a header of the test packet, measures a delay on the basis of a timestamp set in the header, and measures a fluctuation from a variation of an interval of receiving the test packets.

7. A network verification apparatus verifying a network to which a relay apparatus relays a packet, the network verification apparatus comprising:
- a condition acquiring unit to acquire verification conditions for verifying the network by user input and/or by communicating with the testing apparatus, wherein the verification conditions include a test target network address as a test target;
- a registering unit to register, in an address resolution table of the relay apparatus, an entry in which the test target network address contained in the verification conditions acquired by the condition acquiring unit is associated with a physical address of the network verification apparatus itself;
- a test packet transmitting unit to transmit, after the registering unit has registered the entry, a plurality of test packets to form a plurality of connections on the basis of the verification conditions;
- a test packet receiving unit to receive the plurality of test packets; and
- a measuring unit to measure communication qualities with respect to the respective connections of the plurality of test packets received by the test packet receiving unit.

8. The network verification apparatus according to claim 7, further comprising a changing unit to change setting of the relay apparatus so that the entry registered by the registering unit is not erased by an auto-updating function of the address resolution table of the relay apparatus.

9. The network verification apparatus according to claim 7, wherein the condition acquiring unit acquires the verification conditions further containing a protocol type, the registering unit determines the relay apparatus of which the address resolution table is updated corresponding to the protocol type contained in the verification conditions, and the network verification apparatus further comprises a loop-back unit to transmit, if the protocol type set in the test packet received by the test packet receiving unit is a predetermined protocol, a response test packet as a response to the received packet toward a source network address of the received packet.

10. The network verification apparatus according to claim 7, wherein the condition acquiring unit acquires the verification conditions further containing a transmission interval, the test packet transmitting unit transmits the plurality of test packets of each connection at the transmission interval contained in the verification conditions, and the measuring unit measures a loss by detecting a missing sequence number that is to be set in a header of the test packet, measures a delay on the basis of a timestamp set in the header, and measures a fluctuation from a variation of an interval of receiving the test packets.

* * * * *